United States Patent
Zhu

(10) Patent No.: US 7,417,686 B2
(45) Date of Patent: Aug. 26, 2008

(54) CONVERSION OF INTERLACED VIDEO STREAMS INTO PROGRESSIVE VIDEO STREAMS

(75) Inventor: Ge Zhu, Shanghai (CN)

(73) Assignee: Hnaya Microelectronics, Ltd, San Jose, CA (US)

( * ) Notice: Subject to any disclaimer, the term of this patent is extended or adjusted under 35 U.S.C. 154(b) by 550 days.

(21) Appl. No.: 11/066,694

(22) Filed: Feb. 24, 2005

(65) Prior Publication Data

US 2005/0243204 A1    Nov. 3, 2005

(30) Foreign Application Priority Data

Apr. 29, 2004    (CN)    .................... 2004 1 0018071

(51) Int. Cl.
    *H04N 7/01*    (2006.01)
(52) U.S. Cl. ...................... 348/448; 348/452

(58) Field of Classification Search ................ 348/448, 348/441, 458, 459, 452, 451; *H04N 7/01, H04N 11/20*
See application file for complete search history.

(56) References Cited

U.S. PATENT DOCUMENTS

| 6,700,622 B2 * | 3/2004 | Adams et al. ............... 348/448 |
| 6,870,568 B1 * | 3/2005 | Hui ............................ 348/458 |
| 7,176,977 B2 * | 2/2007 | Zhu et al. .................... 348/448 |

* cited by examiner

*Primary Examiner*—Sherrie Hsia
(74) *Attorney, Agent, or Firm*—Silicon Valley Patent Group; Edward S. Mao

(57) ABSTRACT

A method and system for deinterlacing an interlaced video stream is presented. The method and system determines whether an interlaced video stream is a normal mode video stream or a converted mode video stream. Converted mode video streams, which are interlaced video streams created from an original progressive video stream, are deinterlaced using converted mode deinterlacing, which involves merging two fields to form a frame. Normal mode interlaced video streams are deinterlaced using normal mode deinterlacing, which involves converting a field into a frame using line repeating or some form of interpolation to generate the missing scan lines.

39 Claims, 10 Drawing Sheets

CONVERSION OF INTERLACED VIDEO STREAMS INTO PROGRESSIVE VIDEO STREAMS

BACKGROUND OF THE INVENTION

1. Field of the Invention

The present invention relates to digital image and video processing. More specifically, the present invention relates to methods of converting interlaced video streams into progressive (i.e., non-interlaced) video streams.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1 is an illustrative diagram of a portion of interlaced digital video stream 100 most often used in television systems. Interlaced digital video stream 100 comprises a series of individual fields 100_1 to 100_N, of which the first ten fields are shown. Even fields contain even numbered rows while odd fields contain odd numbered rows. For example if a frame has 400 rows of 640 pixels, the even field would contains rows 2, 4, . . . 400 and the odd field would contains rows 1, 3, 5, . . . 399 of the frame. In general for an interlaced video stream each field is formed at a different time. For example, an interlaced video capture device (e.g. a video camera) captures and stores the odd scan lines of a scene at time T as field 100_1, then the video capture device stores the even scan lines of a scene at time T+1 as field 100_2. The process continues for each field. Two main interlaced video standards are used. The PAL (Phase Alternating Line) standard, which is used in Europe, displays 50 fields per seconds and the NTSC (National Television System Committee) standard, which is used in the United States, displays 60 fields per seconds.

Interlaced video systems were designed when bandwidth limitations precluded progressive (i.e., non-interlaced) video systems with adequate frame rates. Specifically, interlacing two 25 fps fields achieved an effective 50 frame per second frame rate because the phosphors used in television sets would remain "lit" while the second field is drawn. Progressive video streams use complete frames, including both the even and odd scan lines instead of fields. Because progressive scan provides better display quality, computer systems, which were developed much later than the original television systems, use progressive scan display systems. Furthermore, many modern televisions and television equipment are being developed to use progressive video streams. To maintain compatibility with existing interlaced video systems, modern progressive systems use deinterlacing techniques to convert interlaced video streams into progressive video streams.

FIGS. 2(a) and 2(b) illustrate a typical method of generating a progressive video stream 200 from an interlaced video stream 100. Specifically each field 100_X of interlaced video stream 100 is converted to a frame 200_X of progressive video stream 200. The conversion of a field to a frame is accomplished by generating the missing scan lines in each frame by copying or interpolating from the scan lines in the field. For example, as illustrated in FIG. 2(b) field 100_1 having odd scan lines 100_1_1, 100_1_3, 100_1_5, . . . 100_1_N, is converted into 200_1 by copying scan lines 100_1_X as odd scan lines 200_1_X, where X is an odd number and creating even scan lines 200_1_Y, where Y is an even number. Even scan lines 200_1_Y can be created by copying the preceding odd scan line 200_1_Y-1. This technique is commonly known as line repeat. Better results can be obtained using various interpolation schemes to generate the missing scan lines. For example, one interpolation scheme simply averages odd scan line 200_1_Y-1 with odd scan line 200_1_Y+1 to generate even scan line 200_1_Y. Other interpolation schemes may use weighted averages or other more complicated ways to combine data from the existing scan lines to generate the missing scan lines. Another normal mode deinterlacing technique known as 3D deinterlacing involves generating the missing scan lines by interpolating the missing pixels using data from adjacent fields. Deinterlacing by interpolation is not an integral part of the present invention. The principles of the present invention can easily be adapted to use any form of interpolation. However, many types of video streams are initially created as progressive video streams and then converted into interlaced video streams. For example, conventional motion pictures are captured and displayed using 24 frames per seconds. To display motion pictures on a PAL (interlaced 50 fields/second) display, each frame is separated into an odd field and an even field. Furthermore, PAL video devices are configured to slightly increase the field rate of the output interlaced video stream to achieve 50 fields/seconds. FIG. 3 illustrates this process. Specifically, FIG. 3 shows the first five frames M_1 to M_5 of a motion picture video stream MPVS being converted to 10 fields of an interlaced video stream 300. Field 300_1 includes the odd scan lines of frame M_1. Field 300_2 includes the even scan lines of frame M_1. Field 300_3 includes the odd scan lines of frame M_2 and Field 300_4 includes the even scan lines of frame M_2. In general a frame M_X is divided into an odd field 300_(X-1)*2+1 containing the odd lines of frame M_X and an even field 300_(X-1)*2+2 containing the even lines of frame M_X. For clarity, portions of interlaced video streams formed from an initial progressive video stream are said to be in "converted mode".

While displaying interlaced video stream 300 on interlaced video systems provide adequate picture quality. Conventional deinterlacing techniques as described above and illustrated in FIGS. 2(a) and 2(b) can be used by a progressive scan display system to view interlaced video stream 300. However, the picture quality of a de-interlaced video stream formed from interlaced video stream 300 is much lower than the picture quality of the original progressive video stream that was used to create interlaced video stream 300.

Hence, there is a need for a deinterlacing method or system that can determine whether portions of an interlaced video stream are in normal mode (e.g. like a normal television signal) or in a converted mode (e.g. formed from an original progressive video stream). The method or system must then deinterlace the given interlaced video stream appropriately.

SUMMARY

Accordingly, the present invention provides a method and system for deinterlacing an interlaced video stream that determines whether portions of an interlaced video stream are in normal mode or in converted mode. Interlaced video streams in converted mode are deinterlaced using converted mode deinterlacing, which involves merging two fields to form a frame. Interlaced video streams in normal mode video streams are deinterlaced using normal mode deinterlacing, which involves converting a field into a frame using line repeating or some form of interpolation to generate the missing scan lines.

Specifically, in one embodiment of the present invention, a deinterlacing system includes a buffer for storing fields of the input interlaced video stream, a mode detector for determining whether portions of the input interlaced video stream is in converted mode or normal mode, and a field merging and conversion unit to perform either normal mode deinterlacing or converted mode deinterlacing on the input interlaced video stream to create an output progressive video stream. Within the mode detector, a mode detection parameter calculation unit calculates mode detection parameters for current field using both the current field and a preceding field. The mode detection parameters are stored in a mode detection parameter FIFO. A mode analysis unit determines whether a subset of the mode detection parameters in the mode detection parameter FIFO matches an alternating peak-valley pattern which indicates that the current portion of the input interlaced video stream might be in converted mode.

In some embodiments of the present invention, the mode analysis unit includes a peak valley pattern checker. The peak valley checker detects alternating peak valley patterns using data from the mode detection FIFO. In one embodiment of the present invention, the peak valley checker includes a peak detector and a valley detector. The peak detector is configured to detect an alternating peak valley pattern having a peak at a mode detection parameter corresponding to a specific field, such as the current field or the processing field. The valley detector is configured to detect an alternating peak valley pattern having a valley at a mode detection parameter corresponding to the specific field.

The present invention will be more fully understood in view of the following description and drawings.

DETAILED DESCRIPTION

As explained above, interlaced video streams can be in normal mode or converted mode. Many interlaced video streams may also switch back and forth between normal mode and converted mode. To use interlaced video streams on progressive video systems, a deinterlacing system is used to convert the interlaced video stream into a de-interlaced video stream. However, different deinterlacing techniques are used depending on whether the current portion of the incoming interlaced video stream is in converted mode or normal mode.

Figure 1:
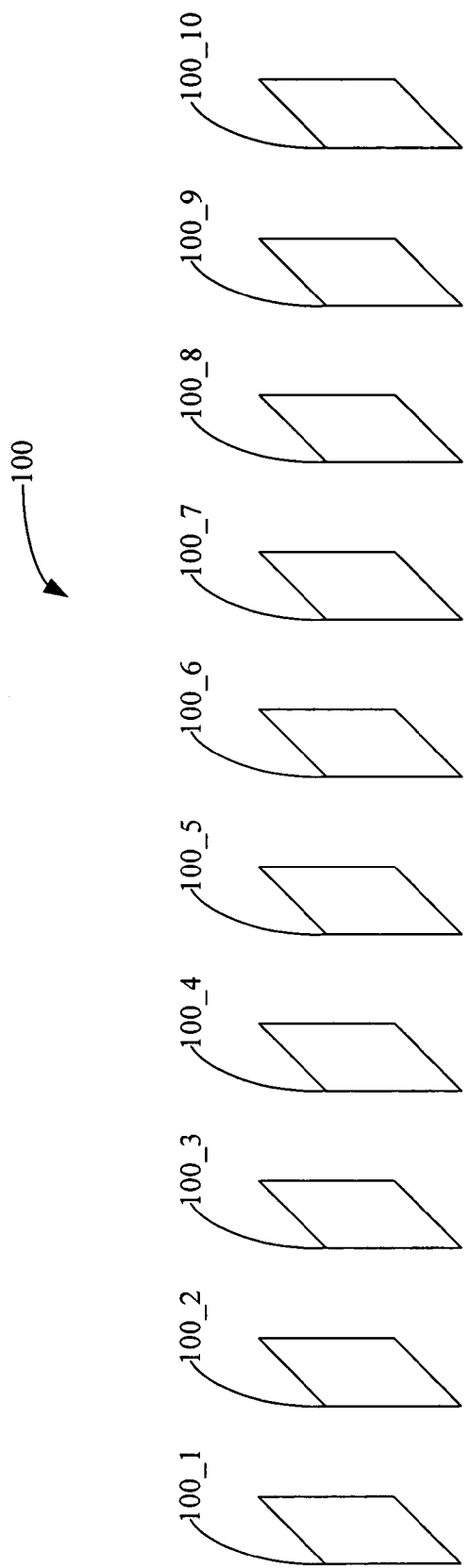
FIG. 1 is an illustration of an interlaced video stream.
Figure 2A:
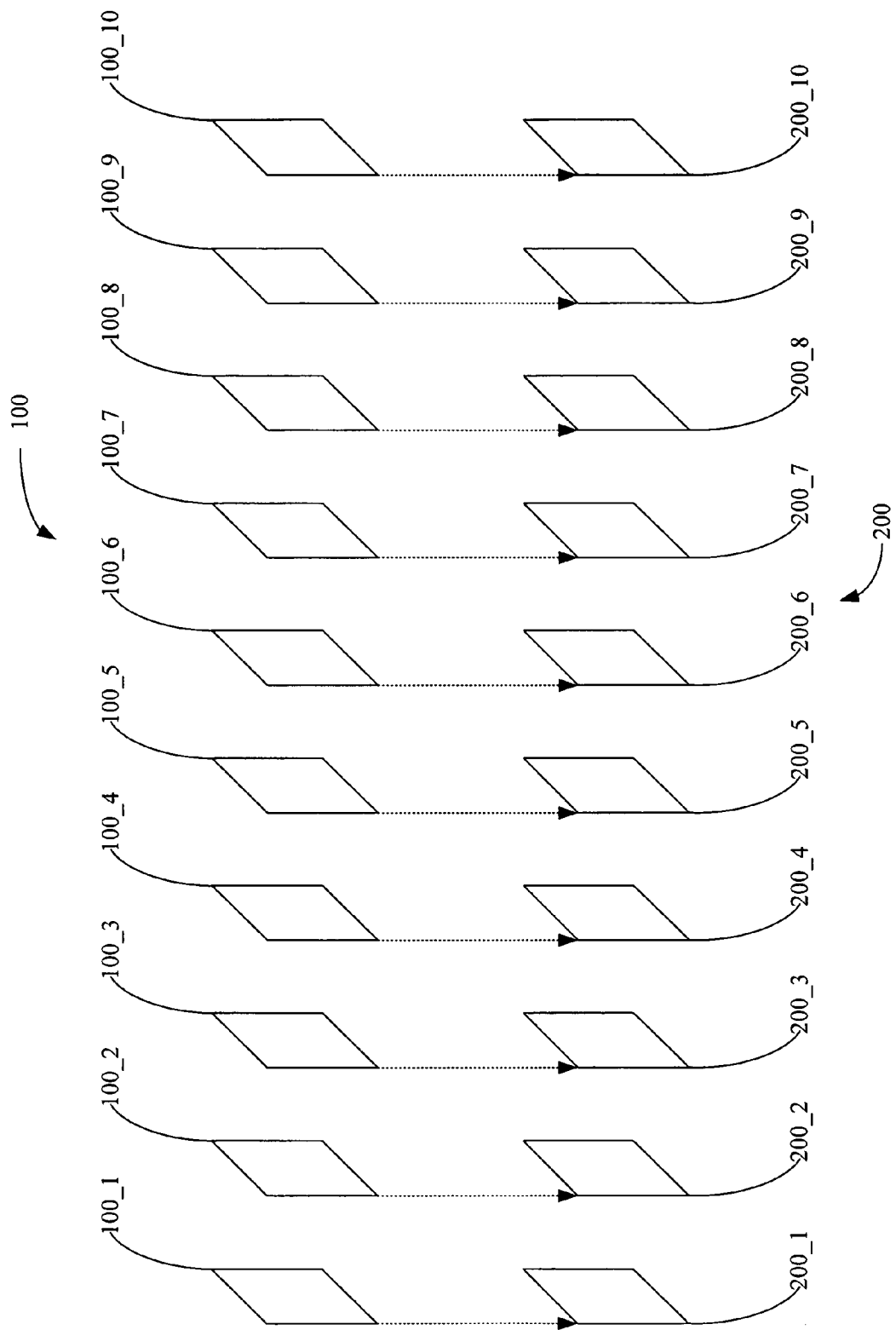
FIGS. 2(a) and 2(b) illustrate a deinterlacing process to form a de-interlaced video stream.
Figure 2B:
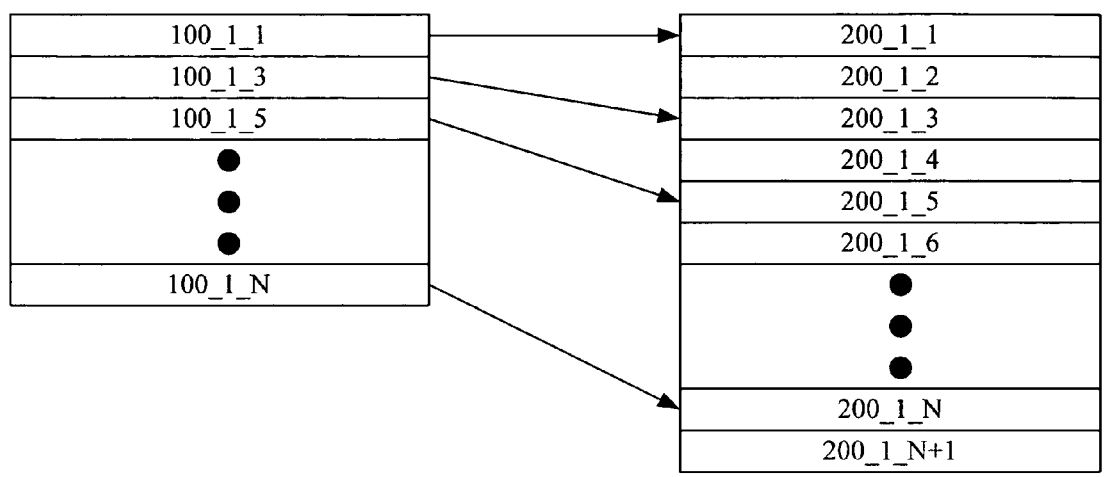
Figure 3:
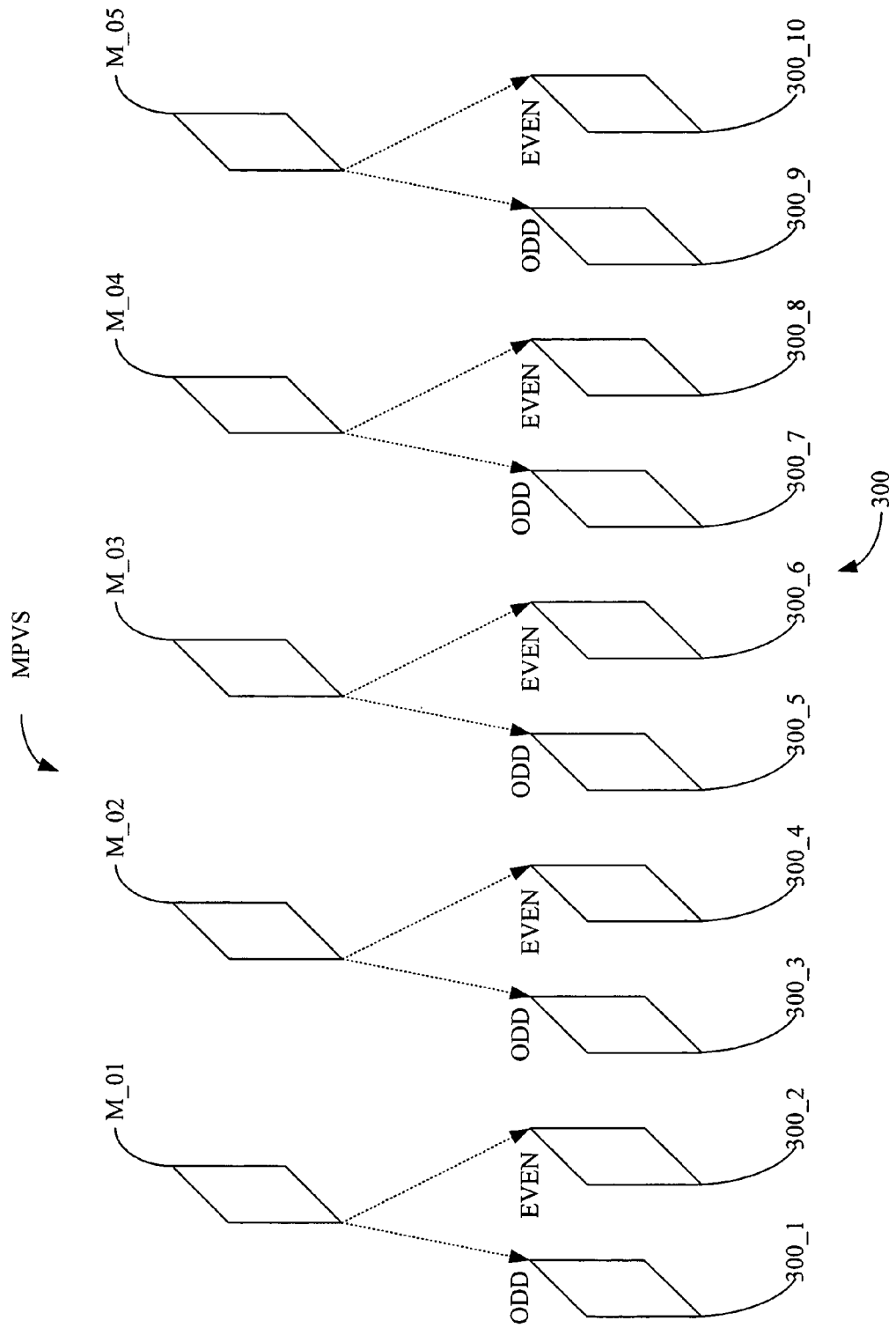
FIG. 3 illustrates a interlacing process used to form an interlaced video stream from a motion picture video stream.
Figure 4:
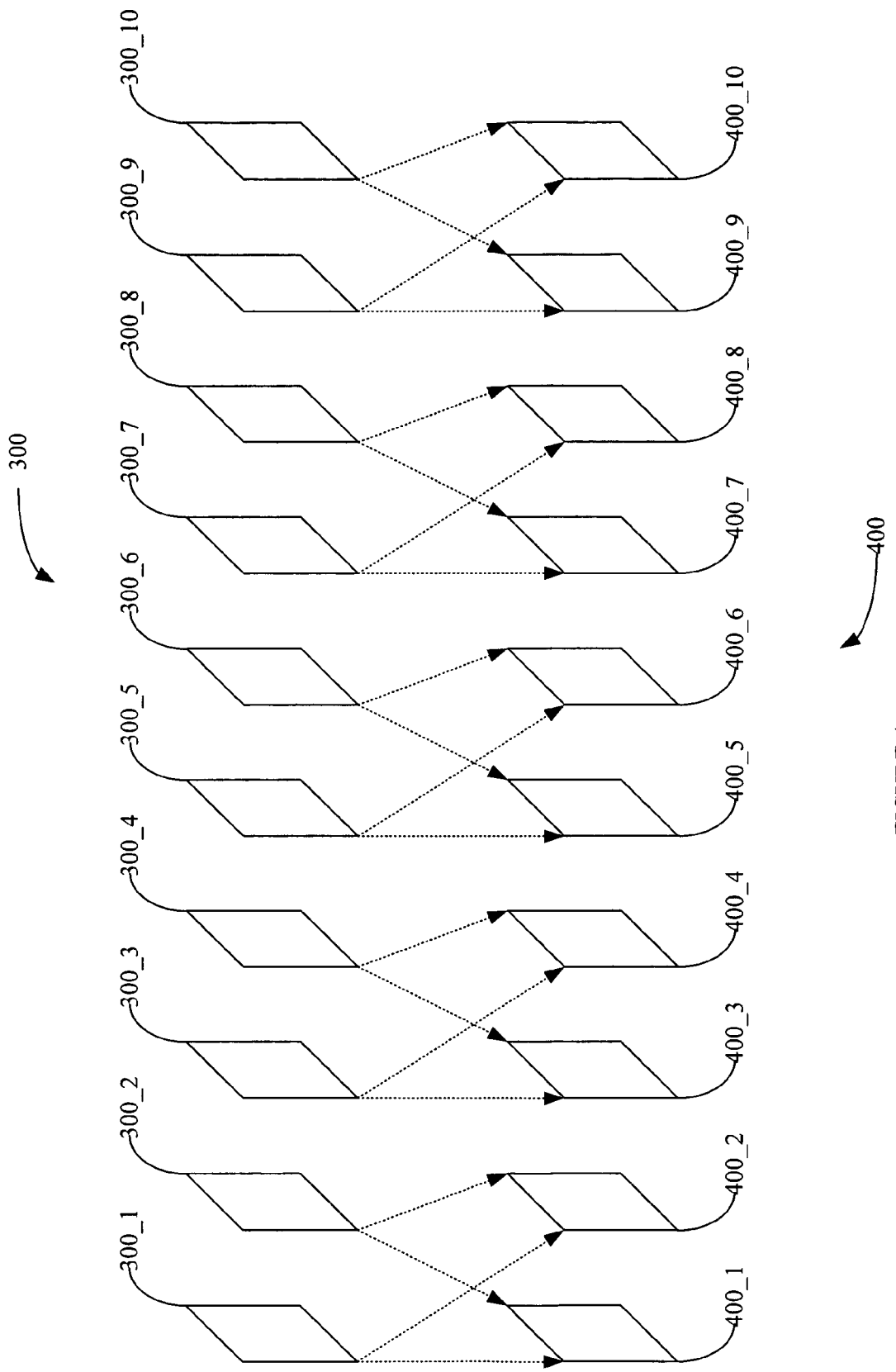
FIG. 4 illustrates a deinterlacing process to form a de-interlaced video stream from an interlaced video stream formed from an original progressive video stream.

FIG. 4 illustrates a method of generating a progressive video stream 400 from interlaced video stream 300, which is in converted mode because interlaced video stream 300 was formed using the interlacing process described above from motion picture video stream MPVS (FIG. 3). Rather than simply converting a field into a frame, embodiments of the present invention merge two fields of a converted mode video stream into a frame. For example, frame 400_1 is formed by merging fields 300_1, which includes the odd scan lines of frame MP_01 (FIG. 3), and field 300_2, which includes the even scan lines of frame MP_01. Thus, frame 400_1 should be the same as frame MP_01. Frame 400_2 can be formed in the same way by merging fields 300_1, which includes the odd scan lines of frame MP_01 (FIG. 3), and field 300_2, which includes the even scan lines of frame MP_01. Frame 400_3 is formed by merging field 300_3, which includes the odd scan lines of frame MP_02, and field 300_4, which includes the even scan lines of frame MP_02. Thus, in general a frame 400_Y, where Y is an odd integer, is formed by merging field 300_Y and 300_Y+1. As illustrated in FIG. 3, field 300_Y contains the odd scan lines of frame M_X, where X is equal to Y plus 1 divided by 2 (i.e. X=(Y+1)/2). Similarly, Field 300_Y+1 contains the even scan lines of frame M_X. Thus, a frame 400_Y formed by merging the odd and even scan lines of Frame M_X, where X is equal to Y plus 1 divided by 2 (i.e. X=(Y+1)/2). Frame 400_Y+1 can be formed by merging fields 300_Y and 300_Y+1 in the same manner as forming frame 400_Y.

Table 2 summarizes the relationship of the frames of progressive video stream 400 and the scan lines of motion picture video stream MPVS, in which Y is an odd integer.

TABLE 2

| Frame | Content |
| --- | --- |
| 400_1 | ALL scan lines of MP_01 |
| 400_2 | ALL scan lines of MP_01 |
| 400_3 | ALL scan lines of MP_02 |
| 400_4 | ALL scan lines of MP_02 |
| 400_5 | ALL scan lines of MP_03 |
| 400_6 | ALL scan lines of MP_03 |
| 400_7 | ALL scan lines of MP_04 |
| 400_8 | ALL scan lines of MP_04 |
| 400_9 | ALL scan lines of MP_05 |
| 400_10 | ALL scan lines of MP_05 |
| 400_Y | ALL scan lines of MP_((Y + 1)/2) |
| 400_Y + 1 | ALL scan lines of MP_((Y + 1)/2) |

Thus, deinterlacing of a converted mode interlaced video stream by merging appropriate fields results in a new progressive video stream that repeats each frame of the original progressive stream that was used to form the converted mode video stream. The new progressive video stream has twice the frame rate of the original progressive video stream, and the new progressive video stream has similar quality to the original progressive video stream and much higher video quality than a progressive video stream formed using standard mode deinterlacing of the converted mode interlaced video stream.

The present invention determines whether portions of an interlaced video stream is in converted mode or normal mode by calculating a mode detection parameter MDP between each field i and field i−1, i.e. the field preceding field i. By analyzing the pattern of mode detection parameters for a series of fields, the present invention can determine whether portions of the incoming interlaced video stream are in converted mode or normal mode.

For clarity, the pixels of an incoming video stream is denoted as pixel $p(i,j,k)$, where i is a field number of the incoming video stream, j is row in the field, and k is the column position within the field. In odd fields (i.e., fields with odd scan lines), j is an odd integer. Conversely, for even fields (i.e. fields with even scan lines), j is an even integer. Thus, for example pixel p(4, 6, 40) in incoming video stream 300 refers to the 40th pixel on row 6 of field 300_4, where the rows are numbered 2, 4, 6 etc. Similarly, pixel p(5, 7, 40) refers to the 40th pixel on row 7 of field 300_5, where the rows are numbered 1, 3, 5, 7, etc. Furthermore, fields of the incoming video stream are said to have H rows of W pixels. For an odd field the H rows are numbered as 1, 3, 5, ... 2*H−1, i.e. j is an odd integer in the range of 1 to 2*H−1, inclusive. For an even field the H rows are numbered as 2, 4, 6, ... 2*H, i.e. j is an even integer in the range of 2 to 2*H, inclusive. For both even and odd fields, the pixels are numbered from 1 to W, inclusive, i.e. k is an integer in the range of 1 to W, inclusive.

In one embodiment of the present invention, the mode detection parameter is equal to the number of non-still pixels in a field that is significantly larger than both a corresponding pixel on a previous line in the previous field and a corresponding pixel on a next line in the previous field or significantly smaller than both corresponding pixels on the next and previous lines in the previous field. Specifically, mode detection parameter MDP(i) of a field i is equal to the number of non-still pixels in field i which satisfy the following conditions: the luminance of a non-still pixel p(i, j, k) in field i minus the luminance of a pixel p(i−1, j−1, k) in field i−1 is greater than a detection threshold T_D and the luminance of non-still pixel p(i, j, k) in field i minus the luminance of the pixel p(i−1, j+1, k) in field i−1 is greater than detection threshold T_D, or the luminance of the non-still pixel p(i, j, k) in field i minus the luminance of the pixel p(i−1, j−1, k) in field i−1 is less than negative one times detection threshold T_D and the luminance of non-still pixel p(i, j, k) in field i minus the luminance of the pixel p(i−1, j+1, k) in field i−1 is less than negative one times detection threshold T_D. As stated above, for pixel p(i, j, k), j takes the values of odd integers 1, 3, 5, ..., 2*H−1 when field i is an odd field, and takes the values of even integers 2, 4, 6, ..., 2*H when field i is an even field. For convenience the luminance of a pixel p(i, j, k) is referenced as luminance lp(i, j, k). Equations EQ01a and EQ01b show symbolically how to calculate mode detection parameter MDP(i) for an odd field. In equations EQ01a and EQ01b a variable n is used in place of j; however j is equal to two times n minus 1 (i.e., j=2*n−1).

$$MDP(i) = \sum_{n=2}^{H} \sum_{k=1}^{W} 1 \text{diff}[p(i, 2*n-1, k),\quad\quad\quad (\text{EQ 01a})$$
$$p(i-1, 2*n-2, k), p(i-1, 2*n, k)]$$

$$1\text{diff} = \quad\quad\quad (\text{EQ 01b})$$

$$\begin{cases} 1, \begin{cases} \text{IF pixel } p(i, 2*n-1, k) \text{ in field } i \text{ is non-still, AND} \\ \begin{bmatrix} [(1p(i, 2*n-1, k) - \\ 1p(i-1, 2*n-2, k) > \text{T\_D}) \text{ AND} \\ (1p(i, 2*n-1, k) - \\ 1p(i-1, 2*n, k) > \text{T\_D})] \\ \text{OR} \\ [(1p(i, 2*n-1, k) - \\ 1p(i-1, 2*n-2, k) < -\text{T\_D}) \text{ AND} \\ (1p(i, 2*n-1, k) - \\ 1p(i-1, 2*n, k) < -\text{T\_D})] \end{bmatrix} \end{cases} \\ 0, \text{Otherwise} \end{cases}$$

Equations EQ02a and EQ02b show symbolically how to calculate mode detection parameter MDP(i) for an even field. In equations EQ02a and EQ02b, variable n is again used in place of j. However in Equations EQ02a and EQ02b, j is equal to two times n (i.e., j=2*n).

$$MDP(i) = \sum_{n=1}^{H-1} \sum_{k=1}^{W} 1\text{diff}[p(i, 2*n, k),\quad\quad\quad (\text{EQ 02a})$$
$$p(i-1, 2*n-1, k), p(i-1, 2*n+1, k)]$$

$$1\text{diff} = \begin{cases} 1, \begin{cases} \text{IF pixel } p(i, 2*n, k) \text{ in field } i \text{ is non-still, AND} \quad (\text{EQ 02b}) \\ \begin{bmatrix} [(1p(i, 2*n, k) - \\ 1p(i-1, 2*n-1, k) > \text{T\_D}) \text{ AND} \\ (1p(i, 2*n, k) - \\ 1p(i-1, 2*n+1, k) > \text{T\_D})] \\ \text{OR} \\ [(1p(i, 2*n, k) - \\ 1p(i-1, 2*n-1, k) < -\text{T\_D}) \text{ AND} \\ (1p(i, 2*n, k) - \\ 1p(i-1, 2*n+1, k) < -\text{T\_D})] \end{bmatrix} \end{cases} \\ 0, \text{Otherwise} \end{cases}$$

In the embodiment of the present invention that uses equations EQ01a, EQ01b, EQ02a, and EQ02b, mode detection parameter MDP(i) measures the amount of a "saw tooth" artifact that exists in a frame formed by merging field i with field i−1.

Specifically, luminance difference ldiff determines whether there is a zigzag (i.e. saw tooth) change in the luminance at a non-still pixel in field i when field i is merged with field i−1. The "saw tooth" artifacts are caused by moving edges in the field. Accordingly, luminance difference ldiff is set equal to one only for non-still pixels (i.e. moving pixels), which satisfy the conditions given in EQ01b and EQ02b.

For a converted mode interlaced video signal, proper merging of fields would result in only a small amount of saw tooth artifacts. Proper merging refers to merging an odd field and an even field that were both derived from a single frame of a progressive video stream. For example, merging field 300_2 (FIG. 3) with field 300_1 would be a proper merge. Mode detection parameter MDP(i) would be a small value if merging field i and field i−1 is a proper merge. However, improper merging of fields would result in a large amount of saw tooth artifact. Improper merging refers to merging two fields that were not both derived from a single frame of progressive video stream. For example, merging field 300_3 (FIG. 3) with field 300_2 would be an improper merge. Mode detection parameter MDP(i) would be a large value if merging field i and field i−1 is an improper merge. Merging fields from a normal mode interlaced video stream produces random results for mode detection parameter MDP(i).

A deinterlacing system according to the present invention would calculate a series of mode detection parameters for a series of consecutive fields of an interlaced video stream. Depending on the specific content of the interlaced video stream, the deinterlacing system determines whether the current portion of the interlaced video stream is normal mode or converted mode. For a converted mode interlaced video stream (such as illustrated in FIG. 3) sequential mode detection parameters would exhibit an alternating peak-valley pattern having alternating peaks and valleys and in which the smallest peak is greater than the largest valley. However as explained in more detail with regards to FIGS. 6(*a*) and 6(*b*), the sequence of mode detection parameters for a normal mode interlaced video streams may also exhibit a peak-valley pattern for a short duration of fields. Thus, most embodiments of the present invention use additional criteria to determine the mode of the input video stream.

Figure 5A:
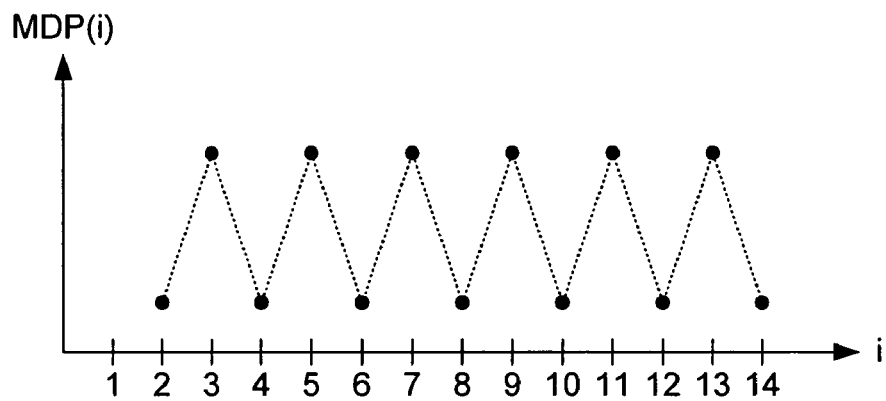
FIGS. 5(a)-5(c) illustrate mode detection parameters for various converted mode video streams.
Figure 5B:
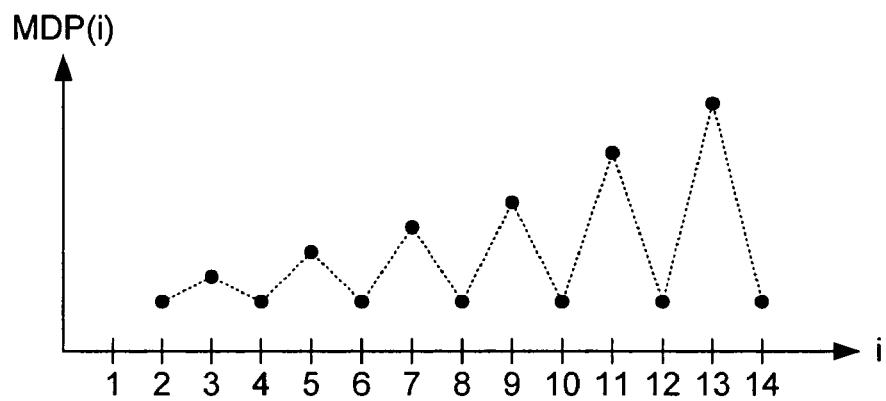
Figure 5C:
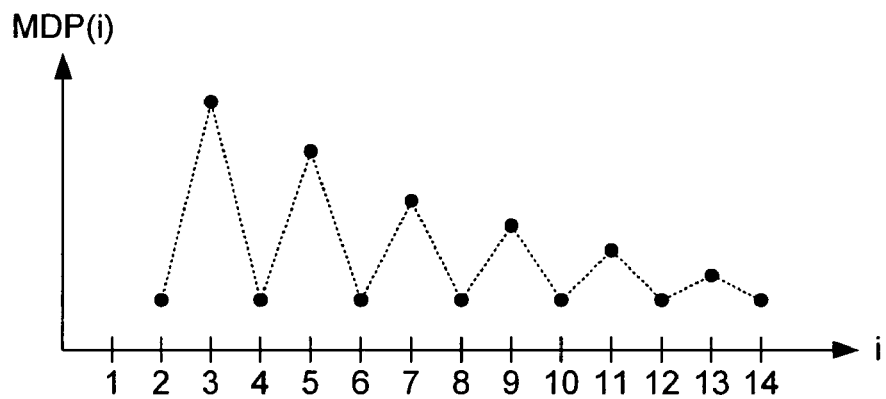
Figure 6A:
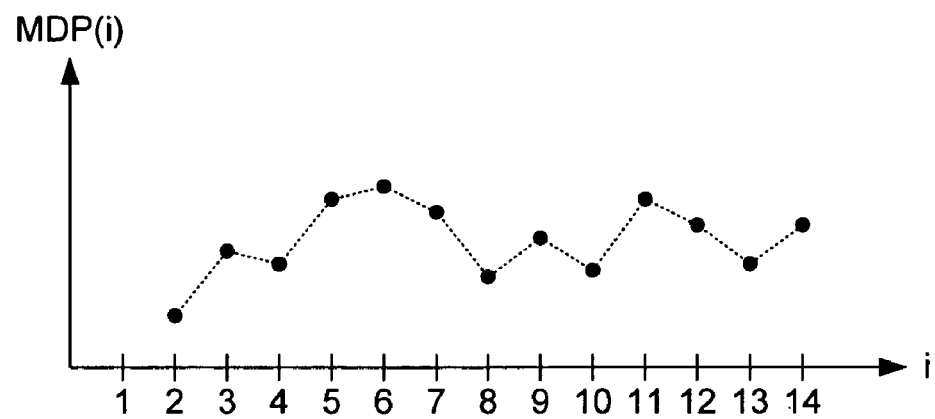
FIGS. 6(a) and 6(b) illustrate mode detection parameters for various normal mode video streams.
Figure 6B:
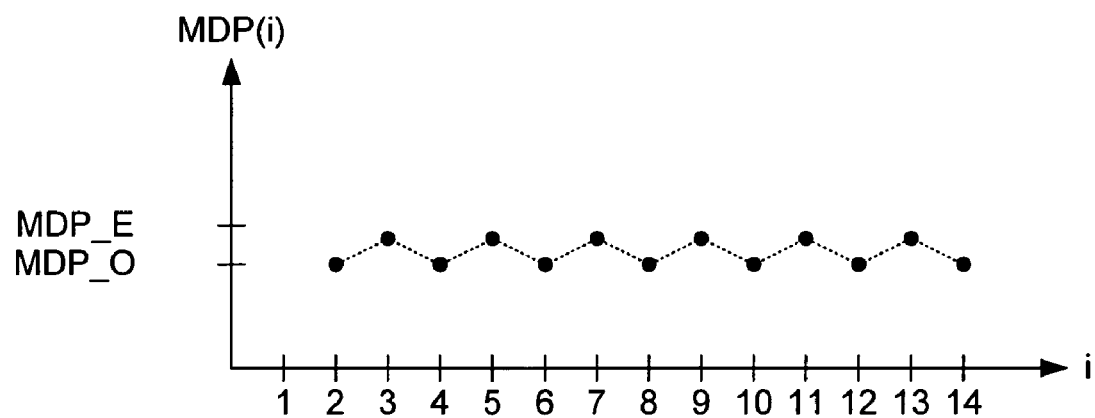

FIGS. 5(a)-5(c) illustrate mode detection parameters MDP (i) sequences generated from converted mode interlaced video streams having three common content types. FIG. 6(a) illustrates a typical mode detection parameter sequence for a normal mode interlaced video stream. FIG. 6(b) illustrates a specific mode detection parameter sequence generated from a normal mode interlaced video stream that mimics the mode detection parameter sequences of converted mode video streams. Deinterlacing according to the present invention uses the similarities of the mode detection parameter sequences of converted mode interlaced video streams and the differences between the sequences of mode detection parameters of converted mode interlaced video streams and the sequences of mode detection parameters of normal mode interlaced video streams to determine the mode of an input interlaced video stream.

FIG. 5(a) graphs mode detection parameter MDP(i) for a converted mode interlaced video stream having a moving object moving at a relatively constant rate. In FIG. 5(a), the valleys (i.e. low points) at i equals 2, 4, 6, . . . 14 indicate fields that should be merged with the preceding field. The peaks (i.e. high points) at i equals 3, 5, 7, . . . 13 indicate fields that should not be merged with the preceding field. As explained-above, moving edges causes large saw tooth patterns and thus large mode detection parameters on improper merges. Because the moving object is moving at a constant rate, the mode detection parameters for the improper merge are all of similar values.

FIG. 5(b) graphs mode detection parameter MDP(i) for a converted mode interlaced video stream having a moving object moving at an increasing rate. In FIG. 5(b), the valleys at i equals 2, 4, 6, . . . 14 indicate fields that should be merged with the preceding field. The peaks at i equals 3, 5, 7, . . . 13 indicate fields that should not be merged with the preceding field. As explained above, moving edges causes large saw tooth patterns and thus large mode detection parameters on improper merges. Because the moving object is moving at an increasing rate, the mode detection parameters for the improper merge are also increasing.

FIG. 5(c) graphs mode detection parameter MDP(i) for a converted mode interlaced video stream having a moving object moving at an decreasing rate. In FIG. 5(c), the valleys at i equals 2, 4, 6, . . . 14 indicate fields that should be merged with the preceding field. The peaks at i equals 3, 5, 7, . . . 13 indicate fields that should not be merged with the preceding field. As explained above, moving edges causes large saw tooth patterns and thus large mode detection parameters on improper merges. Because the moving object is moving at a decreasing rate, the mode detection parameters for the improper merge are also decreasing.

Similarities between FIGS. 5(a), 5(b), and 5(c), include an alternating peak-valley pattern, i.e. a large MDP, followed by a small MDP, followed by a large MDP, followed by small MDP, etc. However, normal mode interlaced video stream, which would generate a random pattern for a series of mode detection parameters MDP(i) may also exhibit the alternating peak-valley pattern for short durations. Specifically, as illustrated in FIG. 6(a), the sequence of mode detection parameters MDP(i) starting at MDP(7), i.e. i=7 to MDP(11), i.e. i=11, also display an alternating peak-valley pattern. However, because the sequence of mode detection parameters MDP(i) for normal mode interlaced video streams are random, the alternating peak-valley pattern usually does not persist over very many fields. Furthermore, an alternating peak-valley pattern for normal mode interlaced video streams usually does not satisfy the condition that the smallest peak is greater than the largest valley. Depending on the contents of the interlaced video stream some interlaced video stream may have a persistent alternating peak-valley pattern of mode detection parameters MDP(i). Specifically, when a normal mode interlaced video stream includes an object moving at a constant rate, the mode detection parameters MDP(i) for odd fields (fields containing odd scan lines) are all roughly equal and shown as odd mode detection parameter MDP_O in FIG. 6(b). Conversely, the mode detection parameters MDP(i) for even fields are all roughly equal and shown as even mode detection parameter MDP_E. Thus, these normal mode interlaced video streams also have a persistent alternating peak-valley pattern. However, the ratio between the peaks and valleys of normal mode interlaced video streams are usually smaller than for converted mode interlaced video streams. Thus, most embodiments of the present invention detect converted mode interlaced video streams by finding persistent alternating peak-valley patterns in which the smallest peak is greater than the largest valley, and the ratio of the peaks to the valleys are large.

Figure 7:
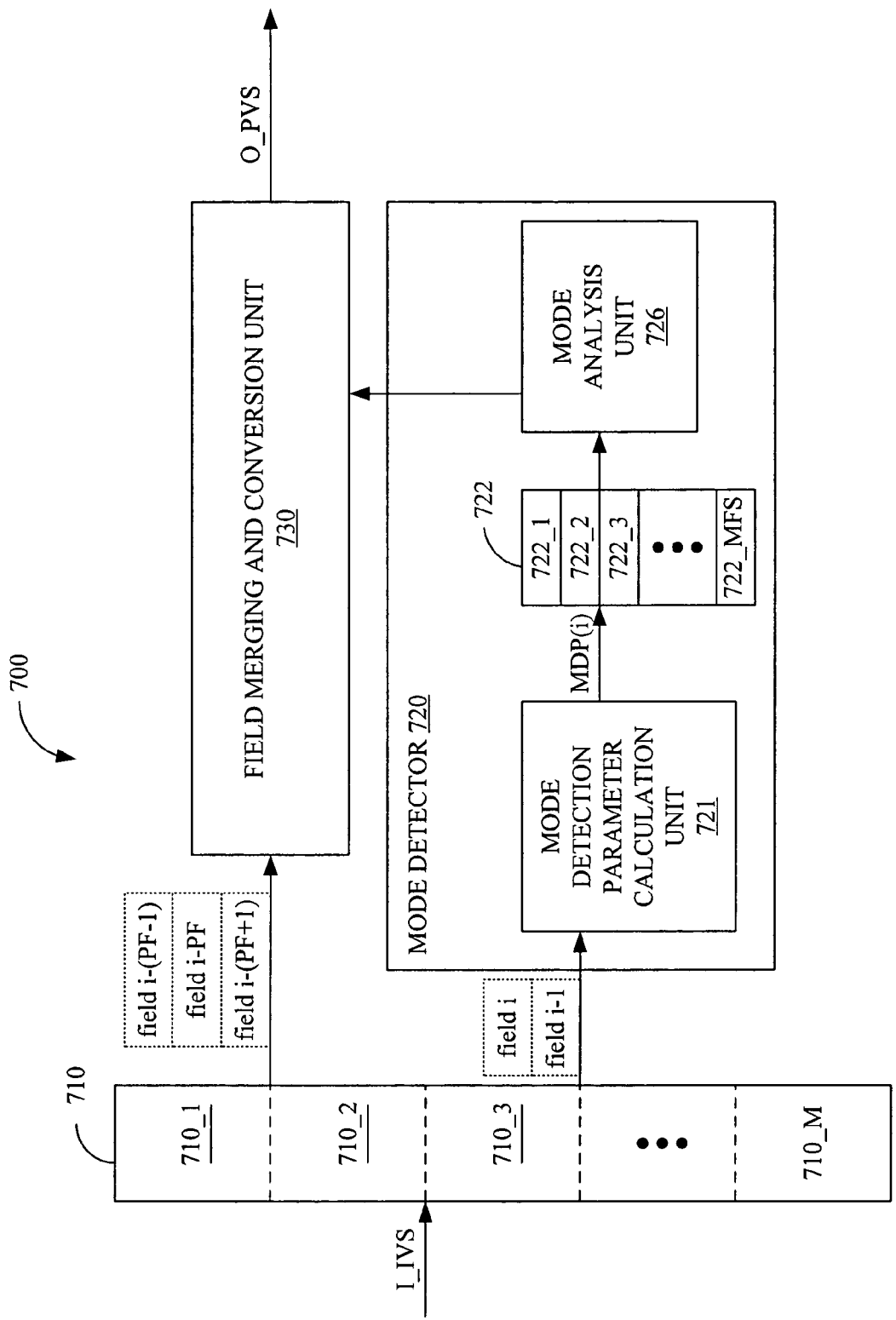
FIG. 7 is a simplified block diagram of a deinterlacing system in accordance with one embodiment of the present invention.

FIG. 7 is a simplified block diagram of a deinterlacing system 700, which receives an input interlaced video stream I_IVS and generates an output progressive video stream O_PVS in accordance with one embodiment of the present invention. Deinterlacing system 700 includes a buffer 710, a mode detector 720, and a field merging and conversion unit 730. In the embodiment of FIG. 7, buffer 710 has M field buffers 710_1, 710_2, 710_3, . . . 710_M. Buffer 710 is used as a circular buffer so that the first field of input interlaced video stream I_IVS is written into field buffer 710_1, the second field of input interlaced video stream I_IVS is written into field buffer 710_2, the third field of input interlaced video stream I_IVS is written into field buffer 710_3. This process continues to the Mth field of input interlaced video stream I_IVS, which is written into field buffer 710_M. Then the (M+1)th field of input interlaced video stream I_IVS is written into field buffer 710_1, the (M+2)th field of input interlaced video stream I_IVS is written into field buffer 710_2, the (M+3)th field of input interlaced video stream I_IVS is written into field buffer 710_3, and so forth with the (M+M)th field of input interlaced video stream I_IVS is written into field buffer 710_M. This process continues for all the fields of input interlaced video stream I_IVS.

Thus, in general buffer 710 contains the M most recent fields from input interlaced video stream I_IVS. Deinterlacing system 700 generally uses various field pointers to track which field buffer contains the earliest field. For clarity, the most recent field in buffer 710 is referenced as current field i. The field preceding current field i is referenced as field i−1, the field preceding field i−1 is referenced as field i−2, and the oldest field in buffer 710 is referenced as field i−(M−1). Circular buffers are well known in the art and are typically implemented with various pointers to allow reading and writing at desired field locations.

Field merging and conversion unit 730 processes a processing field, which is referenced using a processing field parameter PF as field i−PF, to generate an output frame for output progressive video stream O_PVS. Processing field parameter PF represents a distance between the current field (i.e., field i) and the processing field (i.e., field i−PF). Field merging and conversion unit 730, which is controlled by mode detector 720 (as explained below), can be configured to perform converted mode deinterlacing or normal mode deinterlacing. For converted mode deinterlacing, field merging and conversion unit 730 merges the processing field with either the field that precedes the processing field or the field that follows the processing field to form a frame. For normal mode deinterlacing field merging and conversion unit 730 converts the processing field into a frame using conventional techniques such as interpolation, line repeat, or 3D deinterlacing. In the embodiment of FIG. 7, for converted mode deinterlacing, field merging and conversion unit 730 merges the processing field (i.e. field i–PF) with either field i–(PF–1) or field i–(PF+1) to form a frame. For normal mode deinterlacing field merging and conversion unit 730 converts field i–PF into a frame using conventional techniques such as interpolation, line repeat, or 3D deinterlacing. In general, the processing field is the second oldest field in buffer 710 (i.e. field i–(M–2)) because field merging and conversion unit 730 requires the field that precedes the processing field and the field that follows the processing field. Thus, the oldest field can not be used as the processing field. Furthermore, using the second oldest field as the processing field allows mode detector to analyze more fields to determine how to process the processing field as compared to using more recent fields as the processing field. However, some embodiments of the present invention allow a user to define different fields to be the processing field. Using a field more recent than the second oldest field in general allows faster reaction to changes from normal to converted mode (and converted to normal mode). However, the actual detection of normal or converted mode may be less accurate. In a specific embodiment of the present invention, field buffer 710 includes 4 (i.e., M=4) field buffers and the processing field is field i–2 (i.e., PF=2).

Mode detector 720 includes a mode detection parameter calculation unit 721, a mode detection parameter (MDP) FIFO 722, and a mode analysis unit 726. Mode detection parameter calculation unit 721 calculates a mode detection parameter MDP(i) (as described above) when each current field i is written into buffer 710. Mode detection parameter MDP(i) is written into MDP FIFO 722. The size in data words of MDP FIFO 722 is equal to a MDP FIFO size MFS. Specifically, MDP FIFO 722 includes data words 722_1 to 722_MFS. In general MDP FIFO size MFS should be greater than or equal to the distance between the processing field and the current field minus one (i.e., MFS≧PF–1).

MDP FIFO 722 is operated as a FIFO memory. As new data words are "pushed" into data word 722_1, data in data word 722_MFS is "popped" off. Specifically, when mode detection parameter calculation unit 721 needs to write a mode detection parameter into data word 722_1, The contents of data word 722_1 is copied into data word 722_2; the contents of data word 722_2 is copied into data word 722_3; the contents of data word 722_3 is copied into data word 722_4; and in general the contents of data word 722_X is copied into data word 722_X+1. Except that the contents of data word 722_MFS is not retained. In this manner, MDP FIFO 722 stores the MFS most recent mode detection parameters calculated by mode detection parameter calculation unit 721. FIFO memories are well known in the art and are not described in detail herein.

In mode detector 720, data words 722_X contains mode detection parameter MDP(i–X) which corresponds to field (i–X), in which field i is the field currently being input to the system, and mode detection parameter MDP(i–1) of field i–1 is saved in 722_1.

Mode analysis unit 726 examines the contents of MDP FIFO 722 to determine whether field merging and conversion unit 722 should perform converted mode deinterlacing for the processing field (i.e. field i–PF in FIG. 7) by merging the processing field with either the field that precedes the processing field or the field that follows the processing field or normal mode deinterlacing for the processing field. In most embodiments of the present invention mode analysis unit 726 is configured to use the first P data words of MDP FIFO 722. In general, if the processing field is field i–(M–K) (i.e., PF=M–K), with K in the range of 2 to M–2, inclusive (i.e., 2≦K≦M–2), then MDP FIFO size MFS must be larger than or equal to M–K–1, and P is in the range of M–K–1 to MDP FIFO size MFS, inclusive (i.e., M–K–1≦P≦MFS).

In one embodiment of the present invention, mode analysis unit 726 first determines which of three possible conditions are indicated by the mode detection parameters and what actions to take based on the condition. The three conditions are as follows: 1) an alternating peak valley pattern with mode detection parameter MDP(i–PF) being a valley, 2) an alternating peak valley pattern with mode detection parameter MDP(i–PF) being a peak, and 3) no alternating peak-valley pattern. As explained above, mode detection parameter MDP(i–PF) measures the amount of a "saw tooth" artifact that exists in a frame formed by merging field i–PF with field i–(PF+1). Properly merged fields would result in small "saw tooth" artifacts. Thus, if mode detection parameter MDP(i–PF) is a peak, a frame formed by merging field i–PF with field i–(PF+1) is likely to be mismerged. Conversely, if mode detection parameter MDP(i–PF) is a valley, a frame formed by merging field i–PF with field i–(PF+1) is likely to be properly merged. Therefore, when mode analysis unit 726 detects an alternating peak valley pattern with mode detection parameter MDP(i–PF) being a valley, mode analysis unit 726 causes field merging and conversion unit 730 to merge field i–PF (i.e., the processing field) with field i–(PF+1), (i.e., the field preceding the processing field). When mode analysis unit 726 detects an alternating peak valley pattern with mode detection parameter MDP(i–PF) being a peak, mode analysis unit 726 causes field merging and conversion unit 730 to merge field i–PF (i.e. the processing field) with field i–(PF–1), (i.e. the field following the processing field). When mode analysis unit 726 does not detect an alternating peak valley pattern, mode analysis unit 726 causes field merging and conversion unit 730 to perform normal mode deinterlacing on field i–PF (i.e., the processing field).

To determine if the P most recent mode detection parameters (i.e., MDP(i–1), MDP(i–2), . . . MDP(i–P)) exhibit an alternating peak valley pattern, mode analysis unit 726 finds a minimum peak value MPV, which is the minimum mode detection parameter at the expected peaks of the P most recent mode detection parameters, and a maximum valley value MVV, which is the maximum mode detection parameter at the expected valleys of the P most recent mode detection parameters. If minimum peak value MPV multiplied by a valley to peak threshold T_VP is greater than maximum valley value MVV (i.e. MPV*T_VP>MVV) then the mode detection parameters satisfy the alternating peak-valley pattern.

To detect condition 1) an alternating peak valley pattern with mode detection parameter MDP(i–PF) being a valley, mode detection parameter MDP(i–PF) is expected to be a valley. Thus, if an alternating peak valley pattern exists, the other expected valleys are mode detection parameters MDP(i–(PF–2*x)), MDP(i–(PF–2*(x–1))), . . . MDP(i–(PF–2)), MDP(i–PF), MDP(i–(PF+2)), . . . MDP(i–(PF+2*(y–1))), MDP(i–(PF+2*y)), where (PF–2*x) is greater than or equal to 1 and (PF+2*y) is less than or equal to P. Thus, for example if P is equal to 5 and PF is equal to 2, the expected valleys are mode detection parameters MDP(i–2) and MDP(i–4). Similarly if P is equal to 5 and PF is equal to 3, the expected valleys are mode detection parameters MDP(i−1), MDP(i−3), and MDP(i−5). When mode detection parameter MDP(i−PF) is expected to be a valley, mode detection parameter MDP(i−(PF−1)) is expected to be a peak. Therefore, the other expected peaks are mode detection parameters MDP(i−(PF−1−2*m)), MDP(i−(PF−1−2*(m−1))), ... MDP(i−(PF−1−2)), MDP(i−(PF−1)), MDP(i−(PF−1+2)), ... MDP(i−(PF−1+2*(n−1))), MDP(i−(PF−1+2*n)), where (PF−1−2*m) is greater than or equal to 1 and (PF−1+2*n) is less than or equal to P. Thus, for example if P is equal to 5 and PF is equal to 2, the expected peaks are mode detection parameters MDP(i−1), MDP(i−3), and MDP(i−5). Similarly if P is equal to 5 and PF is equal to 3, the expected peaks are mode detection parameters MDP(i−2) and MDP(i−4).

To detect condition 2) an alternating peak valley pattern with mode detection parameter MDP(i−PF) being a peak, mode detection parameter MDP(i−PF) is expected to be a peak. Thus, if an alternating peak valley pattern exists, the other expected peaks are mode detection parameters MDP(i−(PF−2*x)), MDP(i−(PF−2*(x−1))), ... MDP(i−(PF−2)), MDP(i−PF), MDP(i−(PF+2)), ... MDP(i−(PF+2*(y−1))), MDP(i−(PF+2*y)), where (PF−2*x) is greater than or equal to 1 and (PF+2*y) is less than or equal to P. Thus, for example if P is equal to 5 and PF is equal to 2, the expected peaks are mode detection parameters MDP(i−2) and MDP(i−4). Similarly if P is equal to 5 and PF is equal to 3, the expected peaks are mode detection parameters MDP(i−1), MDP(i−3), and MDP(i−5). When mode detection parameter MDP(i−PF) is expected to be a peak, mode detection parameter MDP(i−(PF−1)) is expected to be a valley. Therefore, the other expected valleys are mode detection parameters MDP(i−(PF−1−2*m)), MDP(i−(PF−1−2*(m−1))), ... MDP(i−(PF−1−2)), MDP(i−(PF−1)), MDP(i−(PF−1+2)), ... MDP(i−(PF−1+2*(n−1))), MDP(i−(PF−1+2*n)), where (PF−1−2*m) is greater than or equal to 1 and (PF−1+2*n) is less than or equal to P. Thus, for example if P is equal to 5 and PF is equal to 2, the expected valleys are mode detection parameters MDP(i−1), MDP(i−3), and MDP(i−5). Similarly if P is equal to 5 and PF is equal to 3, the expected valleys are mode detection parameters MDP(i−2) and MDP(i−4).

Figure 8:
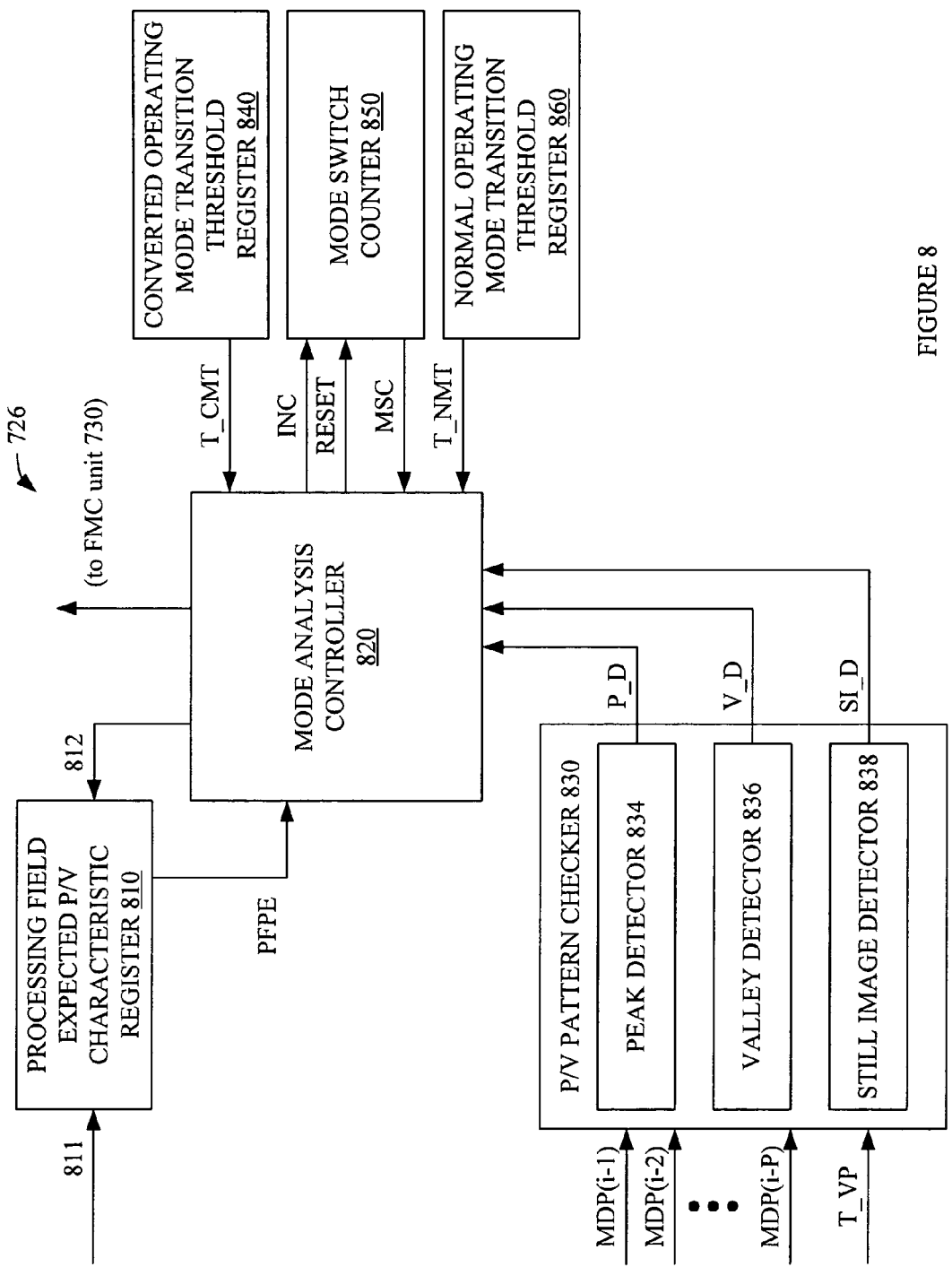
FIG. 8 is a block diagram of a mode analysis unit in accordance with one embodiment of the present invention.

FIG. 8 is a block diagram of an embodiment of mode analysis unit 726 that operates mode detector 720 using a bi-modal approach. Specifically, the embodiment of FIG. 8 has a normal operating mode and a converted operating mode. In general, normal operating mode is used when the input interlaced video stream is in normal mode, and converted operating mode is used when the input interlaced video stream is in converted mode. While in normal operating mode, mode analysis unit 726 analyzes the mode detection parameters to determine when to switch to the converted operating mode. Similarly, while in converted operating mode, mode analysis unit 726 analyzes the mode detection parameters to determine when to switch to the normal operating mode. For clarity, the embodiment of FIG. 8 is described with the processing field parameter PF being an even number. However, use of odd processing field parameters is also summarized below.

The embodiment of FIG. 8 includes a processing field expected peak valley (P/V) characteristic register 810, a mode analysis controller 820, a peak valley (P/V) pattern checker 830, a converted operating mode transition threshold register 840, a operating mode switch counter 850, and a normal operating mode transition threshold register 860. Expected peak valley characteristic register 810 provides a processing field peak expected signal PFPE, which indicates whether the mode detection parameter corresponding with the processing field is expected to be a peak or a valley. Specifically, processing field peak expected signal PFPE is set to a TRUE value (e.g. Logic high) to indicate that mode detection parameter MDP(i−PF) (i.e. the mode detection parameter corresponding to the processing field) is expected to be a peak. Conversely, processing field peak expected signal PFPE is set to a FALSE value (e.g. logic low) to indicate that mode detection parameter MDP(i−PF) (i.e., the mode detection parameter corresponding to the processing field) is expected to be a valley. Processing field peak expected signal PFPE can be set to an initial value by a user through a control port 811. The initial value of processing field peak expected signal PFPE only affects the initial few frames of the output progressive video stream O_PVS. In one embodiment of the present invention the initial value of processing field peak expected signal PFPE is set to the TRUE value. Processing field peak expected signal PFPE is provided to mode analysis controller 820, which can also adjust the value of processing field peak expected signal PFPE through a control port 812.

Peak valley pattern checker 830 is configured to analyze mode detection parameters MDP(i−1), MDP(i−2), ... MDP(i−P) to determine whether the alternating peak valley pattern (described above) is satisfied. In the embodiment of FIG. 8, peak valley pattern checker 830 includes a peak detector 834, a valley detector 836, and a still image detector 838. Peak detector 834 determines whether the mode detection parameters satisfy the alternating peak valley pattern beginning with a peak (i.e. mode detection parameter MDP(i−1) is a peak). Peak detector 834 generates a Boolean peak detected signal P_D, which is provided to mode analysis controller 820. In one embodiment of the present invention peak detected signal P_D is set equal to a TRUE value (e.g., logic high) when minimum peak value MPV multiplied by valley to peak threshold T_VP is greater than maximum valley value MVV (i.e. MPV*T_VP>MVV). Otherwise, peak detected signal P_D is set equal to a FALSE value (e.g., logic low). In peak detector 834, when P is an even number, maximum valley value is equal to the maximum value from among mode detection parameters MDP(i−2), MDP(i−4), ... MDP(i−P) and minimum peak value MPV is equal to the minimum value from among mode detection parameters MDP(i−1), MDP(i−3), ... MDP(i−(P−1)). When P is an odd number, maximum valley value MVV is equal to the maximum value from among mode detection parameters MDP(i−2), MDP(i−4), ... MDP(i−(P−1)) and minimum peak value MPV is equal to the maximum value from among mode detection parameters MDP(i−1), MDP(i−3), ... MDP(i−P).

Valley detector 836 determines whether the mode detection parameters satisfy the alternating peak valley pattern beginning with a valley (i.e., mode detection parameter MDP(i−1) is a valley). Valley detector 836 generates a Boolean valley detected signal V_D, which is provided to mode analysis controller 820. In one embodiment of the present invention valley detected signal V_D is set equal a TRUE value (e.g., logic high) when minimum peak value MPV multiplied by valley to peak threshold T_VP is greater than maximum valley value MVV (i.e. MPV*T_VP>MVV). Otherwise, valley detected signal V_D is set equal to a FALSE value (e.g., logic low). In valley detector 836, when P is an even number, maximum valley value MVV is equal to the maximum value from among mode detection parameters MDP(i−1), MDP(i−3), MDP(i−(P−1)) and minimum peak value MPV is equal to the minimum value from among mode detection parameters MDP(i−2), MDP(i−4), MDP(i−P). When P is an odd number, maximum valley value MVV is equal to the maximum value from among mode detection parameters MDP(i−1), MDP(i−3), ... MDP(i−P) and minimum peak value MPV is equal to the minimum value from among mode detection parameters MDP(i−2), MDP(i−4), ... MDP(i−(P−1))).

Still image detector 838 is used during converted operation mode to determine whether the input interlaced video stream contains a series of still fields, i.e. fields in which the images have little or no motion. When mode analysis controller 820 is operating in converted operating mode, the series of still fields should not cause a switch to normal operating mode. However, as explained above, the "saw tooth" patterns used to calculate the mode detection parameters only make use of non-still pixels. Thus, for still images, the calculated mode detection parameters are very small and may equal zero. Accordingly, peak detector 834 and valley detector 836 are unlikely to find the alternating peak valley pattern during the series of still fields. Therefore, still image detector 838 provides a Boolean still image detected signal to mode analysis controller 820 so that mode analysis controller 820 does not erroneously switch from converted operating mode to normal operating mode due to the series of still file. When a series of still fields is detected still image detector 838 drives still image detected signal SI_D to a TRUE value (e.g. logic high); otherwise, still image detector 838 drives still image detected signal SI_D to a FALSE value (e.g., logic low). In one embodiment of the present invention, a series of still fields is detected when all the mode detection parameters (i.e., MDP (i−1), MDP(i−2), ... MDP(i−P)) are equal to zero. In another embodiment of the present invention, a series of still fields is detected when the X most recent mode detection parameters (i.e., MDP(i−1), MDP(i−2), ... MDP(i−X)) are equal to zero, where X is equal to a user definable number of still field threshold T_NSF. In still another embodiment of the present invention, a series of still fields is detected when the X most recent mode detection parameters (i.e., MDP(i−1), MDP(i−2), ... MDP(i−X)) is less than a user definable still field parameter threshold T_SFP, where X is equal to number of still fields threshold T_NSF.

Converted operating mode transition threshold register 840 stores a converted operating mode transition threshold T_CMT, which is user configurable. Converted operating mode transition threshold T_CMT dictates how many consecutive fields must match the alternating peak valley pattern for mode analysis controller 820 to switch from the normal operating mode to the converted operating mode. Normal operating mode transition threshold register 860 stores a normal operating mode transition threshold T_NMT, which is user configurable. Normal operating mode transition threshold T_NMT dictates how many consecutive fields must fail to match the alternating peak valley pattern for mode analysis controller 820 to switch from the converted operating to the normal operating mode. Mode analysis controller 820 uses mode switch counter 850 to track the number of consecutive matches or number of consecutive mismatches of the mode detection parameters with an alternating peak valley pattern. Mode analysis controller 820 can increment mode switch counter 850 using an increment signal INC and reset mode switch counter 850 using a reset signal RESET. Mode switch counter 850 provides a mode switch count MSC to mode analysis controller 820.

Mode analysis controller 820 operates as a state machine in either normal operating mode or the converted operating mode. Operation of Mode analysis controller 820 is described by a state diagram 900 of FIG. 9. State diagram 900 includes a normal state 910, which represents the normal operating mode, and a converted state 920, which represents the converted operating mode. Mode analysis controller 820 uses a plurality of status signals, variables, thresholds, and parameters, which are not shown in FIG. 9. As illustrated in FIG. 8, mode analysis controller 820 uses peak detected signal P_D, valley detected signal P_V, still image detected signal SI_D, normal operating mode transition threshold T_NMT, converted operating mode transition threshold T_CMT, mode switch count MSC, and processing field peak expected signal PFPE. Mode analysis controller 820 also uses a state variable STATE (not shown), which indicates under which state mode analysis controller 820 is operating. Specifically state variable STATE is equal to 0 when mode analysis controller 820 is operating in normal state 910. Conversely, state variable STATE is equal to 1 when mode analysis controller 820 is operating in converted state 920.

Upon power/on reset, the various user thresholds are defined, processing field peak expected signal PFPE is set to an initial value, and mode switch counter 850 is initialized to zero. Mode analysis controller 820 begins in normal state 910. From normal state 910, mode analysis controller 820 can take one of 8 transitions path T_N_C_1, T_N_C_2, T_N_N_1, T_$_T$_N_N_4, T_N_N_5, or T_N_N_6. For clarity the referen for the transitions paths are of the form T_X_Y_Z, where X indicates the starting state (N for normal state 910 and C for converted state 920), Y indicates the ending state, and Z enumerates the different transitions that can be taken from the same starting state to the same ending states. After each new mode detection parameter MDP(i−1) becomes available, mode analysis controller 820 follows a transition path and causes field merging and conversion unit 730 to create an output frame for output progressive video stream O_PVS(FIG. 7).

Mode analysis controller 820 takes transition path T_N_N_1 from normal state 910 back to normal state 910 when processing field peak expected signal PFPE is equal to the FALSE value, peak detected signal P_D is equal to the TRUE value, and mode switch count MSC is less than converted operating mode transition threshold T_CMT minus 1 (i.e., MSC<T_CMT−1). When mode analysis controller 820 takes transition path T_N_N_1, mode analysis controller 820 causes field merging and conversion unit 730 to use normal mode deinterlacing on field i−PF, causes mode switch count MSC to increment by one, and changes the value of processing field peak expected signal PFPE to equal the TRUE value.

Mode analysis controller 820 takes transition path T_N_N_2 from normal state 910 back to normal state 910 when processing field peak expected signal PFPE is equal to the FALSE value, peak detected signal P_D is equal to the FALSE value, and valley detected signal V_D is equal to the TRUE value. When mode analysis controller 820 takes transition path T_N_N_2, mode analysis controller 820 causes field merging and conversion unit 730 to use normal mode deinterlacing on field i−PF, resets mode switch count MSC to zero, and keeps the value of processing field peak expected signal PFPE at the FALSE value.

Mode analysis controller 820 takes transition path T_N_N_3 from normal state 910 back to normal state 910 when processing field peak expected signal PFPE is equal to the FALSE value, peak detected signal P_D is equal to the FALSE value, and valley detected signal V_D is equal to the FALSE value. When mode analysis controller 820 takes transition path T_N_N_3, mode analysis controller 820 causes field merging and conversion unit 730 to use normal mode deinterlacing on field i−PF, resets mode switch count MSC to zero, and changes the value of processing field peak expected signal PFPE to equal the TRUE value.

Mode analysis controller 820 takes transition path T_N_N_4 from normal state 910 back to normal state 910 when processing field peak expected signal PFPE is equal to the TRUE value, valley detected signal V_D is equal to the TRUE value, and mode switch count MSC is less than converted operating mode transition threshold T_CMT minus 1 (i.e., MSC<T_CMT−1). When mode analysis controller 820 takes transition path T_N_N_4, mode analysis controller 820 causes field merging and conversion unit 730 to use normal mode deinterlacing on field i–PF, causes mode switch count MSC to increment by one, and changes the value of processing field peak expected signal PFPE to equal the FALSE value.

Mode analysis controller 820 takes transition path T_N_N_5 from normal state 910 back to normal state 910 when processing field peak expected signal PFPE is equal to the TRUE value, valley detected signal V_D is equal to the FALSE value, and peak detected signal P_D is equal to the TRUE value. When mode analysis controller 820 takes transition path T_N_N_5, mode analysis controller 820 causes field merging and conversion unit 730 to use normal mode deinterlacing on field i–PF, resets mode switch count MSC to zero, and keeps the value of processing field peak expected signal PFPE at the TRUE value.

Mode analysis controller 820 takes transition path T_N_N_6 from normal state 910 back to normal state 910 when processing field peak expected signal PFPE is equal to the TRUE value, valley detected signal V_D is equal to the FALSE value, and peak detected signal P_D is equal to the FALSE value. When mode analysis controller 820 takes transition path T_N_N_6, mode analysis controller 820 causes field merging and conversion unit 730 to use normal mode deinterlacing on field i–PF, resets mode switch count MSC to zero, and changes value of processing field peak expected signal PFPE to equal the FALSE value.

Mode analysis controller 820 takes transition path T_N_C_1 from normal state 910 to converted state 920 when processing field peak expected signal PFPE is equal to the FALSE value, peak detected signal P_D is equal to the TRUE value, and mode switch count MSC is equal to converted operating mode transition threshold T_CMT minus 1 (i.e., MSC=T_CMT−1). When mode analysis controller 820 takes transition path T_N_C_1, mode analysis controller 820 causes field merging and conversion unit 730 to use converted mode deinterlacing to merge field i–PF with field i–(PF+1), resets mode switch count MSC to zero, and changes the value of processing field peak expected signal PFPE to equal the TRUE value.

Mode analysis controller 820 takes transition path T_N_C_2 from normal state 910 to converted state 920 when processing field peak expected signal PFPE is equal to the TRUE value, valley detected signal V_D is equal to the TRUE value, and mode switch count MSC is equal to converted operating mode transition threshold T_CMT minus 1 (i.e., MSC=T_CMT−1). When mode analysis controller 820 takes transition path T_N_C_2, mode analysis controller 820 causes field merging and conversion unit 730 to use converted mode deinterlacing to merge field i–PF with field i–(PF−1), resets mode switch count MSC to zero, and changes the value of processing field peak expected signal PFPE to equal the FALSE value.

Mode analysis controller 820 takes transition path T_C_C_1 from converted state 920 back to converted state 920 when processing field peak expected signal PFPE is equal to the FALSE value and either peak detected signal P_D or still image detected signal SI_D or both is equal to the TRUE value. When mode analysis controller takes transition path T_C_C_1, mode analysis controller causes field merging and conversion unit 730 to use converted mode deinterlacing to merge field i–PF and field i–(PF+1), resets mode switch count MSC to zero, and changes the value of processing field peak expected signal PFPE to equal the TRUE value.

Mode analysis controller 820 takes transition path T_C_C_2 from converted state 920 back to converted state 920 when processing field peak expected signal PFPE is equal to the FALSE value, valley detected signal V_D is equal to the TRUE value, mode switch count MSC is less than normal operating mode transition threshold T_NMT minus 1 (i.e., MSC<T_NMT−1), and both peak detected signal P_D and still image detected signal SI_D are equal to the FALSE value. When mode analysis controller takes transition path T_C_C_2, mode analysis controller causes field merging and conversion unit 730 to use normal mode deinterlacing on field i–PF, causes mode switch count MSC to increment by one, and keeps the value of processing field peak expected signal PFPE at the FALSE value. Normal mode deinterlacing is used with transition path T_C_C_2 (as well as with transition paths T_C_C_3, T_C_C_5, and T_C_C_6), because the expected alternating peak valley pattern was not detected. A common cause of the loss of the expected alternating peak valley pattern is a bad edit in the formation of the converted mode interlaced video stream. For these bad edits, normal mode deinterlacing generally provides higher picture quality than field merging of possibly mismatched fields.

Mode analysis controller 820 takes transition path T_C_C_3 from converted state 920 back to converted state 920 when processing field peak expected signal PFPE is equal to the FALSE value, valley detected signal V_D is equal to the FALSE value, mode switch count MSC is less than normal operating mode transition threshold T_NMT minus 1 (i.e., MSC<T_NMT−1), and both peak detected signal P_D and still image detected signal SI_D are equal to the FALSE value. When mode analysis controller takes transition path T_C_C_3, mode analysis controller causes field merging and conversion unit 730 to use normal mode deinterlacing on field i–PF, causes mode switch count MSC to increment by one, and changes the value of processing field peak expected signal PFPE to equal the TRUE value.

Mode analysis controller 820 takes transition path T_C_C_4 from converted state 920 back to converted state 920 when processing field peak expected signal PFPE is equal to the TRUE value and either valley detected signal V_D or still image detected signal SI_D or both is equal to the TRUE value. When mode analysis controller takes transition path T_C_C_4, mode analysis controller causes field merging and conversion unit 730 to use converted mode deinterlacing to merge field i–PF and field i–(PF−1), resets mode switch count MSC to zero, and changes the value of processing field peak expected signal PFPE to equal the FALSE value.

Mode analysis controller 820 takes transition path T_C_C_5 from converted state 920 back to converted state 920 when processing field peak expected signal PFPE is equal to the TRUE value, peak detected signal P_D is equal to the TRUE value, mode switch count MSC is less than normal operating mode transition threshold T_NMT minus 1 (i.e., MSC<T_NMT−1), and both valley detected signal V_D and still image detected signal SI_D are equal to the FALSE value. When mode analysis controller takes transition path T_C_C_5, mode analysis controller causes field merging and conversion unit 730 to use normal mode deinterlacing on field i–PF, causes mode switch count MSC to increment by one, and keeps the value of processing field peak expected signal PFPE at the TRUE value.

Mode analysis controller 820 takes transition path T_C_C_6 from converted state 920 back to converted state 920 when processing field peak expected signal PFPE is equal to the TRUE value, peak detected signal P_D is equal to the FALSE value, mode switch count MSC is less than normal operating mode transition threshold T_NMT minus 1 (i.e., MSC<T_NMT−1), and both valley detected signal V_D and still image detected signal SI_D are equal to the FALSE value. When mode analysis controller takes transition path T_C_C_6, mode analysis controller causes field merging and conversion unit 730 to use normal mode deinterlacing on field i-PF, causes mode switch count MSC to increment by one, and changes the value of processing field peak expected signal PFPE to equal the FALSE value.

Mode analysis controller 820 takes transition path T_C_N_1 from converted state 920 to normal state 910 when processing field peak expected signal PFPE is equal to the FALSE value, valley detected signal V_D is equal to the TRUE value, mode switch count MSC is equal to normal operating mode transition threshold T_NMT minus 1 (i.e., MSC=T_NMT-1), and both peak detected signal P_D and still image detected signal SI_D are equal to the FALSE value. When mode analysis controller takes transition path T_C_N_1, mode analysis controller causes field merging and conversion unit 730 to use normal mode deinterlacing on field i-PF, resets mode switch count MSC to zero, and keeps the value of processing field peak expected signal PFPE at the FALSE value.

Mode analysis controller 820 takes transition path T_C_N_2 from converted state 920 to normal state 910 when processing field peak expected signal PFPE is equal to the FALSE value, valley detected signal V_D is equal to the FALSE value, mode switch count MSC is equal to normal operating mode transition threshold T_NMT minus 1 (i.e., MSC=T_NMT-1), and both peak detected signal P_D and still image detected signal SI_D are equal to the FALSE value. When mode analysis controller takes transition path T_C_N_2, mode analysis controller causes field merging and conversion unit 730 to use normal mode deinterlacing on field i-PF, resets mode switch count MSC to zero, and changes value of processing field peak expected signal PFPE to equal the TRUE value.

Mode analysis controller 820 takes transition path T_C_N_3 from converted state 920 to normal state 910 when processing field peak expected signal PFPE is equal to the TRUE value, peak detected signal P_D is equal to the TRUE value, mode switch count MSC is equal to normal operating mode transition threshold T_NMT minus 1 (i.e., MSC=T_NMT-1), and both valley detected signal V_D and still image detected signal SI_D are equal to the FALSE value. When mode analysis controller takes transition path T_C_N_3, mode analysis controller causes field merging and conversion unit 730 to use normal mode deinterlacing on field i-PF, resets mode switch count MSC to zero, and keeps the value of processing field peak expected signal PFPE at the TRUE value.

Mode analysis controller 820 takes transition path T_C_N_4 from converted state 920 to normal state 910 when processing field peak expected signal PFPE is equal to the TRUE value, peak detected signal P_D is equal to the FALSE value, mode switch count MSC is equal to normal operating mode transition threshold T_NMT minus 1 (i.e., MSC=T_NMT-1), and both valley detected signal V_D and still image detected signal SI_D are equal to the FALSE value. When mode analysis controller takes transition path T_C_N_4, mode analysis controller causes field merging and conversion unit 730 to use normal mode deinterlacing on field i-PF, resets mode switch count MSC to zero, and changes the value of processing field peak expected signal PFPE to equal the FALSE value.

The transition conditions and actions for mode analysis controller 820 are summarized in Tables 1(a), 1(b), 2(a), 2(b), 3(a), and 3(b). Specifically, Table 1(a) lists the condition for each transition path from normal stage 910, Table 1(b) lists the action for each transition path in Table 1(a), Table 2(a) lists the condition for each transition path from converted stage 920 when processing field peak expected signal PFPE is equal to the FALSE value, Table 2(b) lists the actions for each transition path in Table 2(a), Table 3(a) lists the condition for each transition path from converted stage 920 when processing field peak expected signal PFPE is equal to the TRUE value, Table 3(b) lists the actions for each transition path in Table 3(a). In the Tables, T is used for the TRUE value, F is used for the FALSE value, and X is used as a don't-care condition.

TABLE 1(a)

| PFPE | P_D | V_D | MSC | Transition Path |
|---|---|---|---|---|
| F | T | X | <(T_CMT − 1) | T_N_N_1 |
| F | T | X | =(T_CMT − 1) | T_N_C_1 |
| F | F | T | X | T_N_N_2 |
| F | F | F | X | T_N_N_3 |
| T | X | T | <(T_CMT − 1) | T_N_N_4 |
| T | X | T | =(T_CMT − 1) | T_N_C_2 |
| T | T | F | X | T_N_N_5 |
| T | F | F | X | T_N_N_6 |

TABLE 1(b)

| Transition Path | Actions Taken |
|---|---|
| T_N_N_1 | MSC = MSC + 1; PFPE = T; NORMAL MODE DEINTERLACING |
| T_N_C_1 | MSC = 0; PFPE=T; MERGE FIELD i − PF and FIELD i − (PF + 1) |
| T_N_N_2 | MSC = 0; NORMAL MODE DEINTERLACING |
| T_N_N_3 | MSC = 0; PFPE=T; NORMAL MODE DEINTERLACING |
| T_N_N_4 | MSC = MSC + 1; PFPE = F; NORMAL MODE DEINTERLACING |
| T_N_C_2 | MSC = 0; PFPE = F; MERGE FIELD i − PF and FIELD i − (PF − 1) |
| T_N_N_5 | MSC = 0; NORMAL MODE DEINTERLACING |
| T_N_N_6 | MSC = 0; PFPE = F; NORMAL MODE DEINTERLACING |

TABLE 2(a)

(PFPE = F)

| (P_D or SI_D) | V_D | MSC | Transition Path |
|---|---|---|---|
| T | X | X | T_C_C_1 |
| F | T | <(T_NMT − 1) | T_C_C_2 |
| F | T | =(T_NMT − 1) | T_C_N_1 |
| F | F | <(T_NMT − 1) | T_C_C_3 |
| F | F | =(T_NMT − 1) | T_C_N_2 |

TABLE 2(b)

(PFPE = F)

| Transition Path | Actions Taken |
|---|---|
| T_C_C_1 | MSC = 0; PFPE = T; MERGE FIELD i − PF and FIELD i − (PF + 1) |
| T_C_C_2 | MSC = MSC + 1; NORMAL MODE DEINTERLACING |
| T_C_N_1 | MSC = 0; NORMAL MODE DEINTERLACING |
| T_C_C_3 | MSC = MSC + 1; PFPE = T; NORMAL MODE DEINTERLACING |
| T_C_N_2 | MSC = 0; PFPE = T; NORMAL MODE DEINTERLACING |

TABLE 3(a)

| | (PFPE = T) | | |
|---|---|---|---|
| (V_D or SI_D) | P_D | MSC | Transition Path |
| T | X | X | T_C_C_4 |
| F | T | <(T_NMT − 1) | T_C_C_5 |
| F | T | =(T_NMT − 1) | T_C_N_3 |
| F | F | <(T_NMT − 1) | T_C_C_6 |
| F | F | =(T_NMT − 1) | T_C_N_4 |

TABLE 3(b)

| | (PFPE = T) |
|---|---|
| Transition Path | Actions Taken |
| T_C_C_4 | MSC = 0; PFPE = F; MERGE FIELD i − PF and FIELD i − (PF − 1) |
| T_C_C_5 | MSC = MSC + 1; NORMAL MODE DEINTERLACING |
| T_C_N_3 | MSC = 0; NORMAL MODE DEINTERLACING |
| T_C_C_6 | MSC = MSC + 1; PFPE = F; NORMAL MODE DEINTERLACING |
| T_C_N_4 | MSC = 0; PFPE = F; NORMAL MODE DEINTERLACING |

Figure 9:
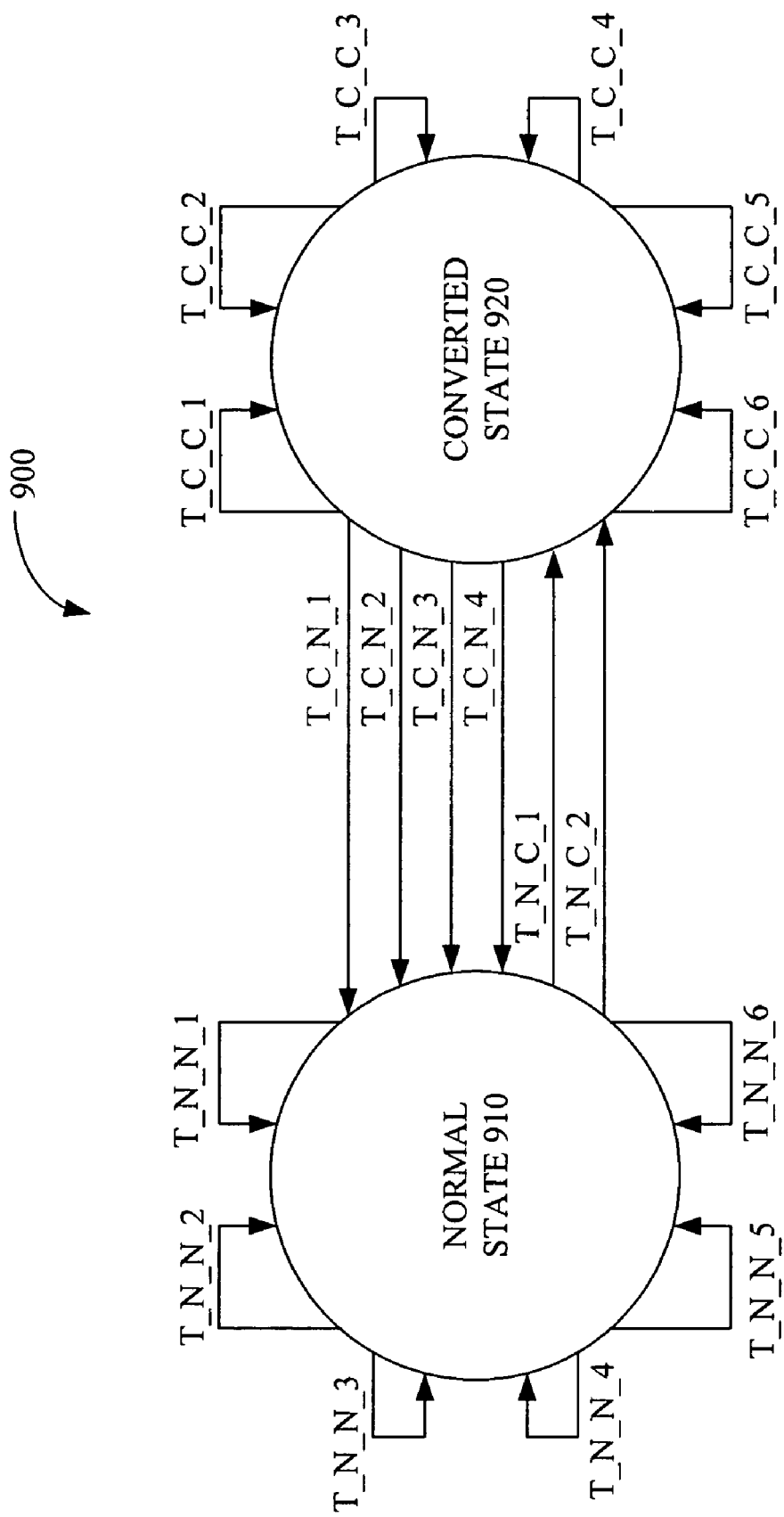
FIG. 9 is a state diagram in accordance with one embodiment of the present invention.

As stated above, the embodiment of FIGS. 8 and 9 assumes processing field parameter PF is equal to an even number. For embodiments of the present invention in which processing field parameter PF is an odd number, the embodiment of FIGS. 8 and 9 should be modified by inverting the value of processing field peak expected signal PFPE.

APPENDIX I provides another embodiment of a deinterlacing system in accordance with the present invention implemented in pseudocode. One skilled in the art can easily convert the pseudocode to a hardware definition language such as VHDL or Verilog to create a deinterlacing system in accordance with the present invention. In the embodiment of Appendix I MDP FIFO size MFS is equal to 5.

In the various embodiments of the present invention, novel structures have been described for deinterlacing systems. By using mode detection parameters a novel method for detecting converted mode video streams is achieved. The various embodiments of the structures and methods of this invention that are described above are illustrative only of the principles of this invention and are not intended to limit the scope of the invention to the particular embodiments described. For example, in view of this disclosure those skilled in the art can define other peak valley patterns, converted mode deinterlacing techniques, normal mode deinterlacing techniques, buffers, mode detectors, mode detection parameter calculation units, mode analysis units, peak valley pattern checkers, peak detectors, valley detectors, still image detectors, mode analysis controllers, field merging and conversion units, threshold levels, and so forth, and use these alternative features to create a method, circuit, or system according to the principles of this invention. Thus, the invention is limited only by the following claims.

APPENDIX I

Copyright (c) 2004 HUAYA Microelectronics
(Shanghai), Inc All Rights Reserved

```
Initialization:
    PFPE    = TRUE
    MSC     = 0
    C_MODE = TRUE "converted mode"
IF PFPE=TRUE
    {
    IF C_MODE=TRUE
        {
        IF MIN(MDP(i−2),MDP(i−4))*T_VP > MAX(MDP(i−1),MDP(i−3),MDP(i−5)
            OR MAX(MDP(i−1),MDP(i−2),MDP(i−3),MDP(i−4),MDP(i−5))<T_SFP
            {
            PFPE=FALSE
            MSC=0
            MARK FIELD i−2 TO MERGE WITH FIELD i−1
            GO TO NEXT FIELD
            }
        ELSE
            {
            MARK FIELD i−2 TO DO NORMAL MODE DEINTERLACING
            IF  MIN(MDP(i−1),MDP(i−3),MDP(i−5))*T_VP
                    >MAX(MDP(i−2),MDP(i−4))
                {
                PFPE=TRUE
                }
            ELSE
                {
                PFPE=FALSE
                }
            MSC = MSC+1
            IF MSC=T_NMT
                {
                MSC=0
                C_MODE=FALSE
                GO TO NEXT FIELD
                }
            }
```

-continued

```
        ELSE
            {
            IF MIN(MDP(i-2),MDP(i-4))*T_VP
                    > MAX(MDP(i-1),MDP(i-3),MDP(i-5))
                {
                PFPE=FALSE
                MSC = MSC+1
                IF MSC=T_CMT
                    {
                    MSC=0
                    C_MODE=TRUE
                    MARK FIELD i-2 TO MERGE WITH FIELD i-1
                    }
                ELSE
                    {
                    MARK FIELD i-2 TO DO NORMAL MODE DEINTERLACING
                    }
                GO TO NEXT FIELD
                }
            ELSE
                {
                MARK FIELD i-2 TO DO NORMAL MODE DEINTERLACING
                MSC=0
                IF MIN(MDP(i-1),MDP(i-3),MDP(i-5))*T_VP
                        >MAX(MDP(i-2),MDP(i-4))
                    {
                    PFPE=TRUE
                    }
                ELSE
                    {
                    PFPE=FALSE
                    }
                GO TO NEXT FIELD
                }
            }
        }
ELSE
    {
    IF C_MODE = TRUE
        {
        IF MIN(MDP(i-1),MDP(i-3),MDP(i-5))*T_VP>MAX(MDP(i-2),MDP(i-4))
            OR MAX(MDP(i-1),MDP(i-2),MDP(i-3),MDP(i-4),MDP(i-5))<T_SFP
            {
            PFPE=TRUE
            MSC=0
            MARK FIELD i-2 TO MERGE WITH FIELD i-3
            GO TO NEXT FIELD
            }
        ELSE
            {
            MARK FIELD i-2 TO DO NORMAL MODE DEINTERLACING
            IF MIN(MDP(i-2),MDP(i-4))*T_VP
                    > MAX(MDP(i-1),MDP(i-3),MDP(i-5))
                {
                PFPE=FALSE
                }
            ELSE
                {
                PFPE=TRUE
                }
            MSC = MSC+1
            IF MSC=T_NMT
                {
                MSC=0
                C_MODE=FALSE
                }
            GO TO NEXT FIELD
            }
        }
    ELSE
        {
        IF MIN(MDP(i-1),MDP(i-3),MDP(i-5))*T_VP>MAX(MDP(i-2),MDP(i-4))
            {
            PFPE=TRUE
            MSC = MSC +1
            IF MSC =T_CMT
                {
                MSC =0
                C_MODE=TRUE
                MARK FIELD i-2 TO MERGE WITH FIELD i-3
```

```
            }
        ELSE
        {
            MARK FIELD i-2 TO DO NORMAL MODE DEINTERLACING
        }
        GO TO NEXT FIELD
        }
    ELSE
    {
        MARK FIELD i-2 TO DO NORMAL MODE DEINTERLACING
        MSC =0
        IF MIN(MDP(i-2),MDP(i-4))*T_VP
                > MAX(MDP(i-1),MDP(i-3),MDP(i-5))
            {
            PFPE=FALSE
            }
        ELSE
            {
            PFPE=TRUE
            }
        GO TO NEXT FIELD
    }
}
```

What is claimed is:

1. A method of deinterlacing an input interlaced video stream having a plurality of fields to form an output progressive video stream having a plurality of frames, the method comprising:
calculating a plurality of mode detection parameters;
detecting whether a subset of the mode detection parameters exhibits an alternating peak-valley pattern;
classifying the input interlaced video stream based on whether the alternating peak-valley pattern is detected;
performing converted mode deinterlacing when the input interlaced video stream is classified as a converted mode video stream; and
performing normal mode deinterlacing when the input interlaced video stream is classified as normal mode video stream.

2. The method of claim 1, wherein the performing converted mode deinterlacing when the input interlaced video stream is classified as converted mode, comprises merging a processing field with a second field from the input interlaced video stream to form a frame of the output progressive video stream.

3. The method of claim 2, wherein the processing field precedes the second field in the input interlaced video stream.

4. The method of claim 2, wherein the processing field follows the second field in the input interlaced video stream.

5. The method of claim 1, wherein the performing normal mode deinterlacing when the input interlaced video stream is classified as normal mode comprises repeating each scan lines in a current field to form a frame.

6. The method of claim 1, wherein the performing normal mode deinterlacing when the input interlaced video stream is classified as normal mode comprises interpolating two scan lines of a field to form a missing scan line.

7. The method of claim 1, wherein the classifying the input interlaced video stream based on whether the alternating peak-valley pattern is detected, further comprises:
incrementing a mode switch counter when the alternating peakvalley pattern is detected; and
classifying the input interlaced video stream as converted mode when the mode switch counter equals a converted operating mode transition threshold.

8. The method of claim 1, wherein the classifying the input interlaced video stream based on whether the alternating peak-valley pattern is detected, further comprises:
incrementing a mode switch counter when the alternating peak-valley pattern is not detected; and
classifying the input interlaced video stream as normal mode when the mode switch counter equals a normal operating mode transition threshold.

9. The method of claim 1, wherein the detecting whether a subset of the mode detection parameters exhibits an alternating peak-valley pattern, further comprises:
calculating a maximum valley value;
calculating a minimum peak value;
determining whether the minimum peak value multiplied by a valley to peak threshold is greater than the maximum valley value.

10. The method of claim 9, wherein the maximum valley value is the maximum mode detection parameter of a plurality of expected valleys in the subset of mode detection parameter.

11. The method of claim 10, wherein the minimum peak value is the minimum mode detection parameter of a plurality of expected peaks in the subset of mode detection parameters.

12. The method of claim 11, wherein the expected peaks and expected valleys alternate in the subset of mode detection parameters.

13. The method of claim 1, wherein a mode detection parameter of a current field is equal to a number of non-still pixels in the current field that is significantly larger than both a corresponding pixel on a previous line in a previous field and a corresponding pixel on a next line in the previous field or significantly smaller than both corresponding pixels on the next and the previous lines in the previous field.

14. A system for deinterlacing an input interlaced video stream having a plurality of fields to form an output progressive video stream having a plurality of frames, the system comprising:
means for calculating a plurality of mode detection parameters;
means for detecting whether a subset of the mode detection parameters exhibits an alternating peak-valley pattern;
means for classifying the input interlaced video stream based on whether the alternating peak-valley pattern is detected;
means for performing converted mode deinterlacing when the input interlaced video stream is classified as a converted mode video stream; and means for performing normal mode deinterlacing when the input interlaced video stream is classified as normal mode video stream.

15. The system of claim 14, wherein the means for performing converted mode deinterlacing when the input interlaced video stream is classified as converted mode, comprises means for merging a processing field with a second field from the input interlaced video stream to form a frame of the output progressive video stream.

16. The system of claim 15, wherein the processing field precedes the second field in the input interlaced video stream.

17. The system of claim 15, wherein the processing field follows the second field in the input interlaced video stream.

18. The system of claim 14, wherein the means for performing normal mode deinterlacing when the input interlaced video stream is classified as normal mode comprises means for repeating each scan lines in a current field to form a frame.

19. The system of claim 14, wherein the means for performing normal mode deinterlacing when the input interlaced video stream is classified as normal mode comprises means for interpolating two scan lines of a field to form a missing scan line.

20. The system of claim 14, wherein the means for classifying the input interlaced video stream based on whether the alternating peak-valley pattern is detected, further comprises:
 means for incrementing a mode switch counter when the alternating peak-valley pattern is detected; and
 means for classifying the input interlaced video stream as converted mode when the mode switch counter equals a converted mode transition threshold.

21. The system of claim 14, wherein the means for classifying the input interlaced video stream based on whether the alternating peak-valley pattern is detected, further comprises:
 means for incrementing a mode switch counter when the alternating peak-valley pattern is not detected; and
 means for classifying the input interlaced video stream as normal mode when the mode switch counter equals a normal mode transition threshold.

22. The system of claim 14, wherein the means for detecting whether a subset of the mode detection parameters exhibits an alternating peak-valley pattern, further comprises:
 means for calculating a maximum valley value;
 means for calculating a minimum peak value;
 means for determining whether the minimum peak value MPV multiplied by a valley to peak threshold is greater than the maximum valley value.

23. The system of claim 22, wherein the maximum valley value is the maximum mode detection parameter of a plurality of expected valleys in the subset of mode detection parameter.

24. The system of claim 23, wherein the minimum peak value is the minimum mode detection parameter of a plurality of expected peaks in the subset of mode detection parameters.

25. The system of claim 24, wherein the expected peaks and expected valleys alternate in the subset of mode detection parameters.

26. The system of claim 14, wherein a mode detection parameter of a current field is equal to a number of non-still pixels in the current field that is significantly larger than both a corresponding pixel on a previous line in a previous field and a corresponding pixel on a next line in the previous field or significantly smaller than both corresponding pixels on the next and the previous lines in the previous field.

27. A deinterlacing system for deinterlacing an input interlaced video stream having a plurality of fields to form an output progressive video stream having a plurality of frames, the deinterlacing system comprising:
 a buffer coupled to receive the input interlaced video stream;
 a mode detector coupled to the buffer and configured to detect whether the input interlaced video stream is in a converted mode; wherein the mode detector comprises:
  a mode detection parameter calculation unit coupled to the buffer; and
  a mode detection parameter FIFO coupled to the mode detection parameter calculation unit; and
 a field merging and conversion unit coupled to the buffer and the mode detector and configured by the mode detector to perform converted mode deinterlacing when the input interlaced video stream is in the converted mode and to perform normal mode deinterlacing when the input interlaced video stream is in a normal mode.

28. The deinterlacing system of claim 27, wherein the buffer comprises:
 a first field buffer;
 a second field buffer;
 a third field buffer; and
 a fourth field buffer.

29. The deinterlacing system of claim 28, wherein the buffer is configured to operate as a circular buffer.

30. The deinterlacing system of claim 27, wherein the mode detection parameter calculation unit is configured to calculate a mode detection parameter of a current field in the buffer.

31. The deinterlacing system of claim 30, wherein the mode detection parameter calculation unit is configured to store the mode detection parameter in the mode detection parameter FIFO.

32. The deinterlacing system of claim 27, wherein the mode detector further comprises a mode analysis unit coupled to the mode detection parameter FIFO and the field merging and conversion unit.

33. The deinterlacing system of claim 32, wherein the mode analysis unit is configured to determine whether the input interlaced video stream is a converted mode video stream.

34. The deinterlacing system of claim 33, wherein the mode analysis unit configures the field merging and conversion unit to perform converted mode deinterlacing when the input interlaced video stream is a converted mode video stream.

35. The deinterlacing system of claim 33, wherein the mode analysis unit configures the field merging and conversion unit to perform normal mode deinterlacing when the input interlaced video stream is not a converted mode video stream.

36. The deinterlacing system of claim 33, wherein the mode analysis unit further comprises a peak valley pattern checker configured to detect alternating peak valley patterns using data from the mode detection parameter FIFO.

37. The deinterlacing system of claim 36, wherein the peak valley pattern checker further comprises:
 a peak detector configured to detect an alternating peak valley pattern having a peak at a mode detection parameter corresponding to a specific field; and
 a valley detector configured to detect an alternating peak valley pattern having a valley at the mode detection parameter corresponding to the specific field.

38. The deinterlacing system of claim 37, wherein the peak valley pattern checker further comprises a still image detector.

39. The deinterlacing system of claim 36, wherein mode analysis unit further comprises:
 a mode switch;
 a expected peak/valley register; and
 mode analysis controller.

* * * * *